(12) United States Patent  (10) Patent No.: US 7,995,839 B2
Tanaka et al.  (45) Date of Patent: Aug. 9, 2011

(54) IMAGE PROCESSING DEVICE AND METHOD WITH DISTANCE CALCULATING ON COLOR SPACE

(75) Inventors: Seiji Tanaka, Asaka (JP); Kenkichi Hayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1149 days.

(21) Appl. No.: 11/785,113

(22) Filed: Apr. 16, 2007

(65) Prior Publication Data

US 2007/0242875 A1  Oct. 18, 2007

(30) Foreign Application Priority Data

Apr. 14, 2006 (JP) .................. 2006-112457

(51) Int. Cl.
*G06K 9/00* (2006.01)
*G06K 9/40* (2006.01)
(52) U.S. Cl. ........ 382/167; 382/260; 382/261; 382/264; 382/266
(58) Field of Classification Search .................. None
See application file for complete search history.

(56) References Cited

U.S. PATENT DOCUMENTS

| | | | | |
|---|---|---|---|---|
| 5,081,692 A * | 1/1992 | Kwon et al. | ................ | 382/263 |
| 5,563,963 A * | 10/1996 | Kaplan et al. | ................ | 382/266 |
| 5,845,017 A * | 12/1998 | Keyes | ................ | 382/261 |
| 6,807,300 B1 * | 10/2004 | Gindele et al. | ................ | 382/167 |
| 6,895,124 B1 | 5/2005 | Kira et al. | | |
| 6,904,169 B2 * | 6/2005 | Kalevo et al. | ................ | 382/167 |
| 7,088,392 B2 * | 8/2006 | Kakarala et al. | ............... | 348/272 |
| 7,127,122 B2 | 10/2006 | Ogata et al. | | |
| 7,657,113 B2 * | 2/2010 | Wong et al. | ................ | 382/260 |
| 2003/0156761 A1 | 8/2003 | Ogata et al. | | |
| 2004/0081366 A1 | 4/2004 | Monobe et al. | | |
| 2004/0086194 A1 * | 5/2004 | Allouche | ................ | 382/260 |
| 2005/0025378 A1 * | 2/2005 | Maurer | ................ | 382/260 |
| 2005/0111751 A1 * | 5/2005 | Avinash | ................ | 382/275 |
| 2005/0276510 A1 * | 12/2005 | Bosco et al. | ................ | 382/275 |

FOREIGN PATENT DOCUMENTS

| | | |
|---|---|---|
| EP | 1 404 120 A1 | 3/2004 |
| JP | 2001-118064 | 4/2001 |
| JP | 2003-8935 | 1/2003 |
| JP | 2004-159311 | 6/2004 |
| WO | WO 03/001793 A1 | 3/2003 |

* cited by examiner

*Primary Examiner* — Samir A Ahmed
*Assistant Examiner* — Li Liu
(74) *Attorney, Agent, or Firm* — McGinn IP Law Group

(57) ABSTRACT

The image processing device according to an aspect of the invention comprises an image input device for inputting image data representing a color image, a distance calculation device for calculating a distance on a color space between a noticed pixel of the inputted color image and each of peripheral pixels including the noticed pixel, a factor calculation device for calculating a weighting factor for each peripheral pixel in accordance with the calculated distance, and a weighted average processing device for calculating image data of the noticed pixel by obtaining a weighted average of image data of the peripheral pixels using the weighting factor calculated for each peripheral pixel.

42 Claims, 28 Drawing Sheets

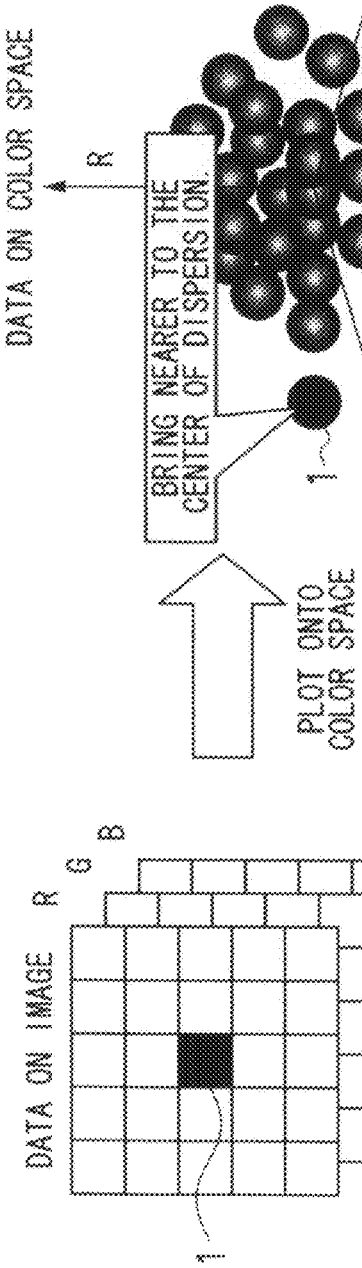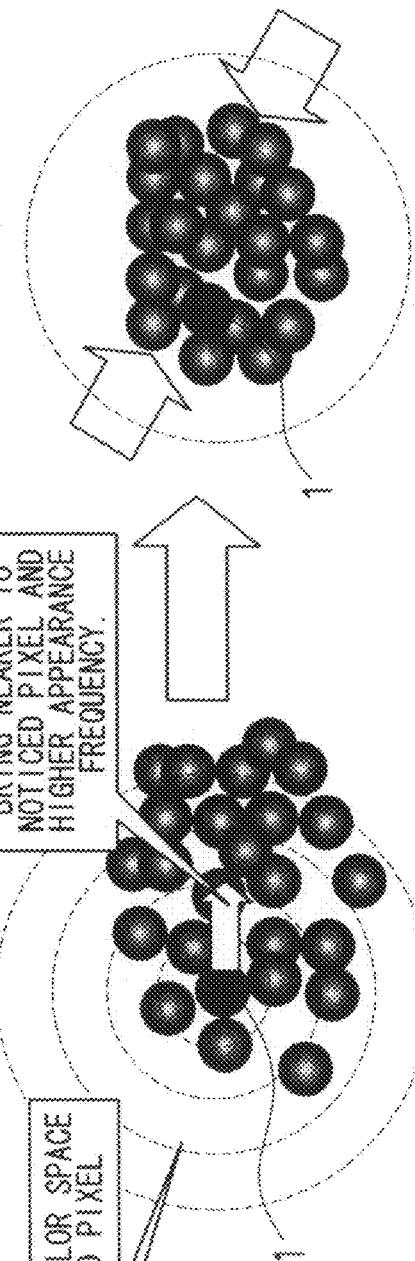

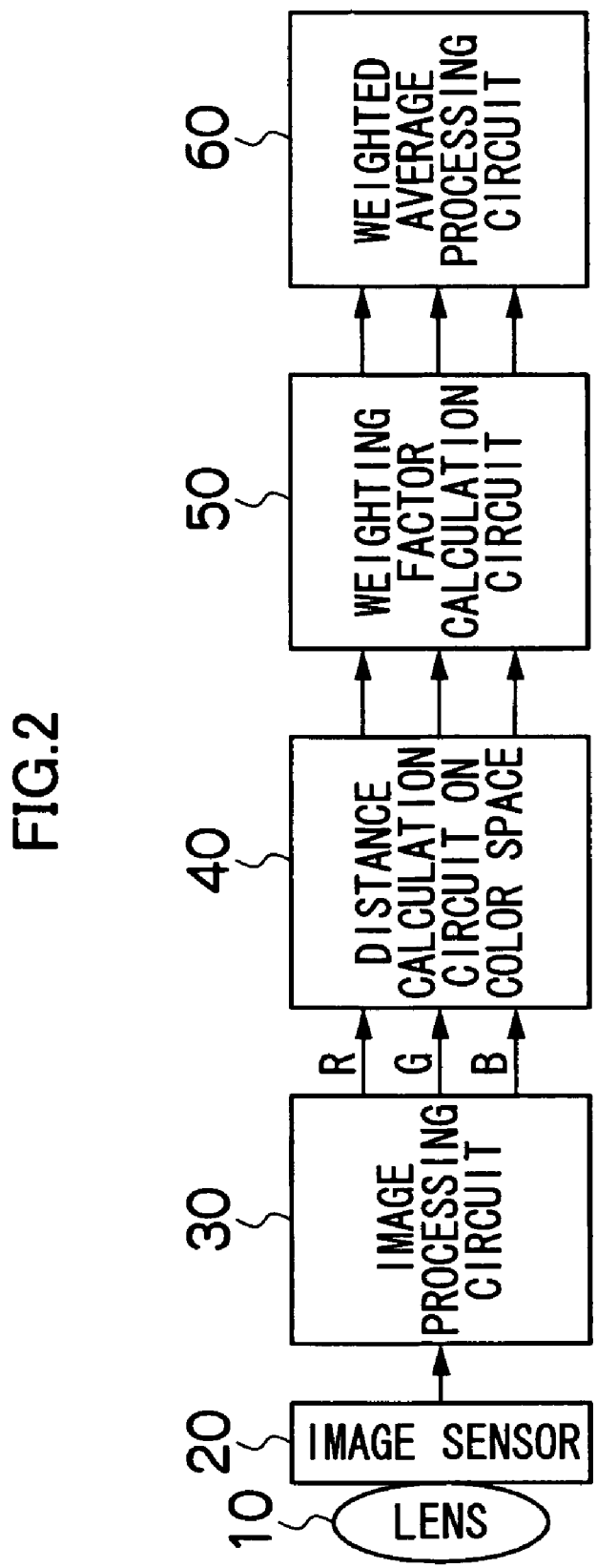

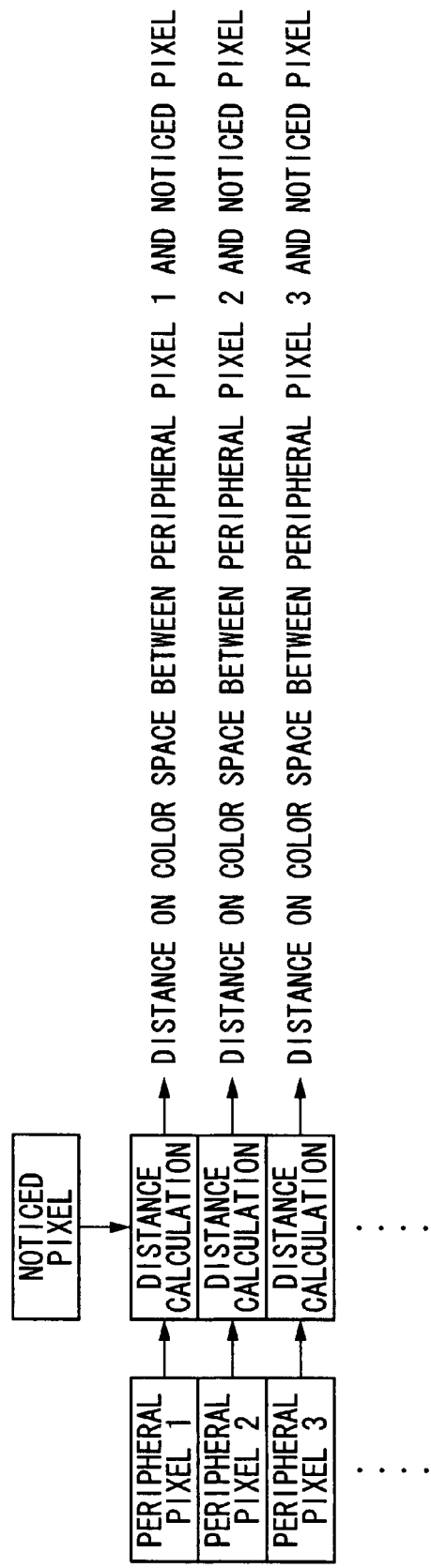

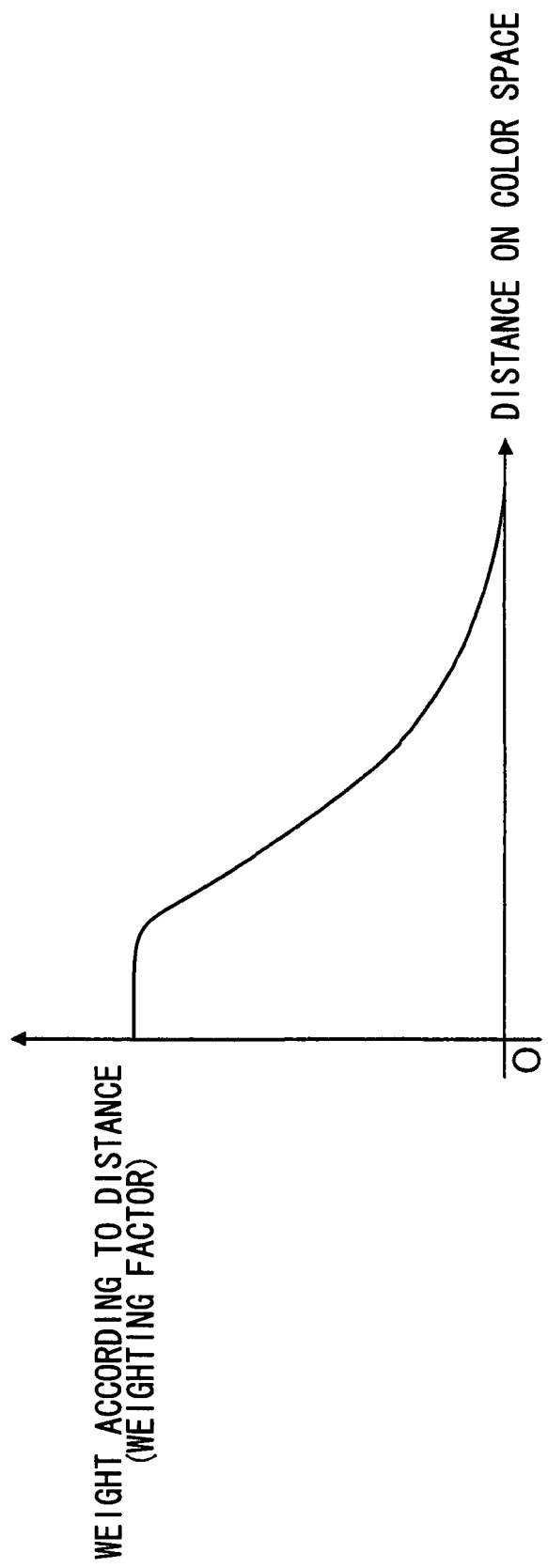

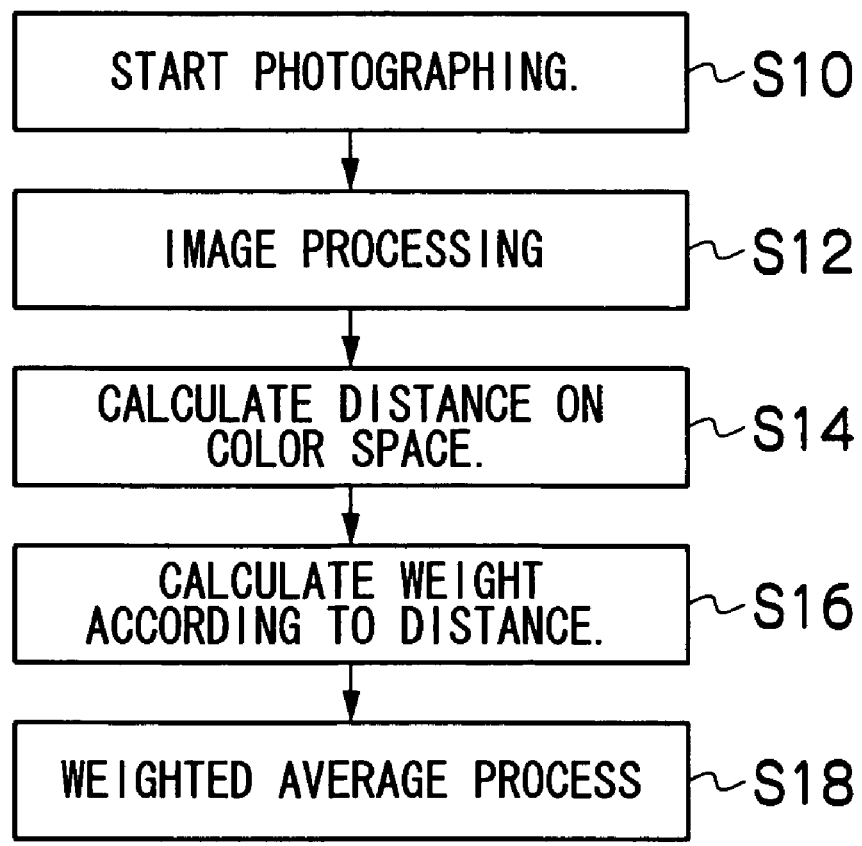

UNLIKELY AFFECTED BY INCREASING WEIGHT IN MIDDLE DISTANCE

LIKELY AFFECTED BY NOISE IN NEAR DISTANCE

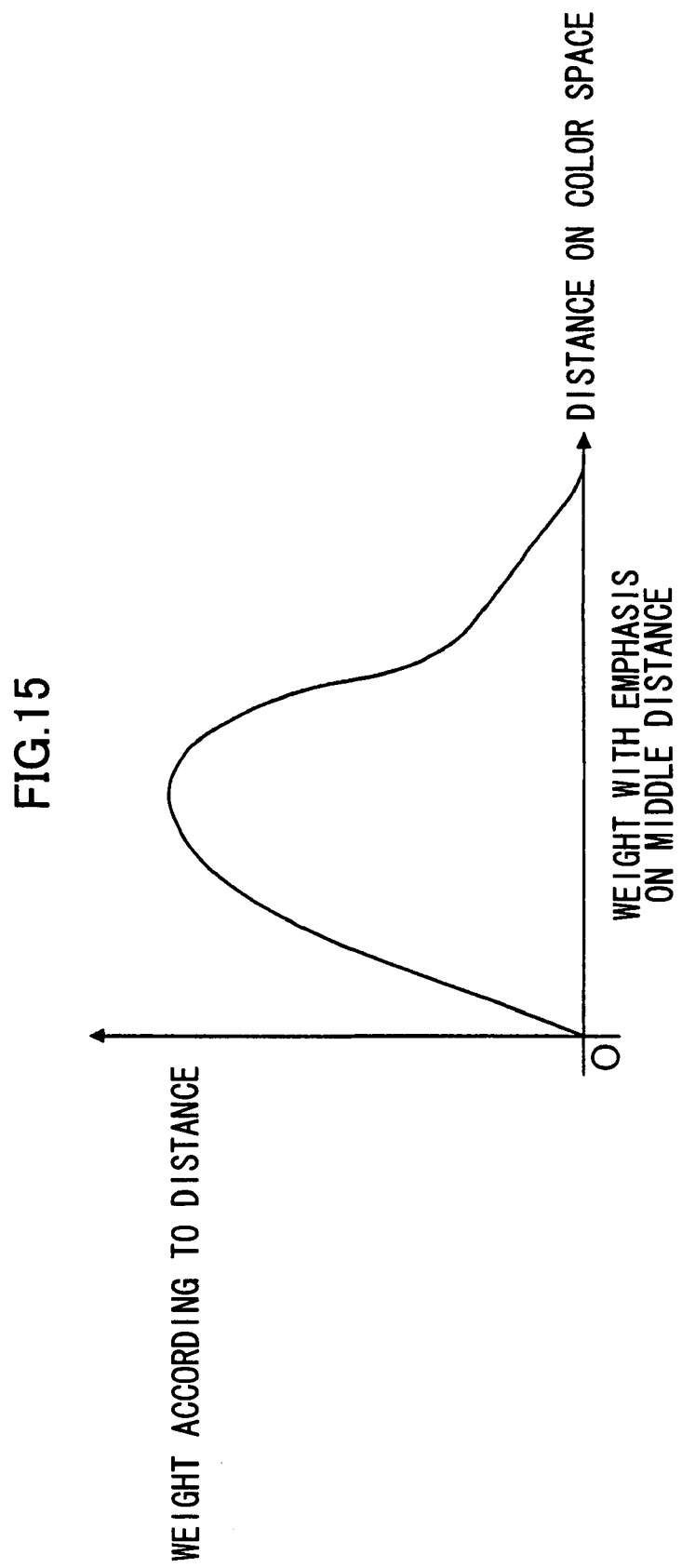

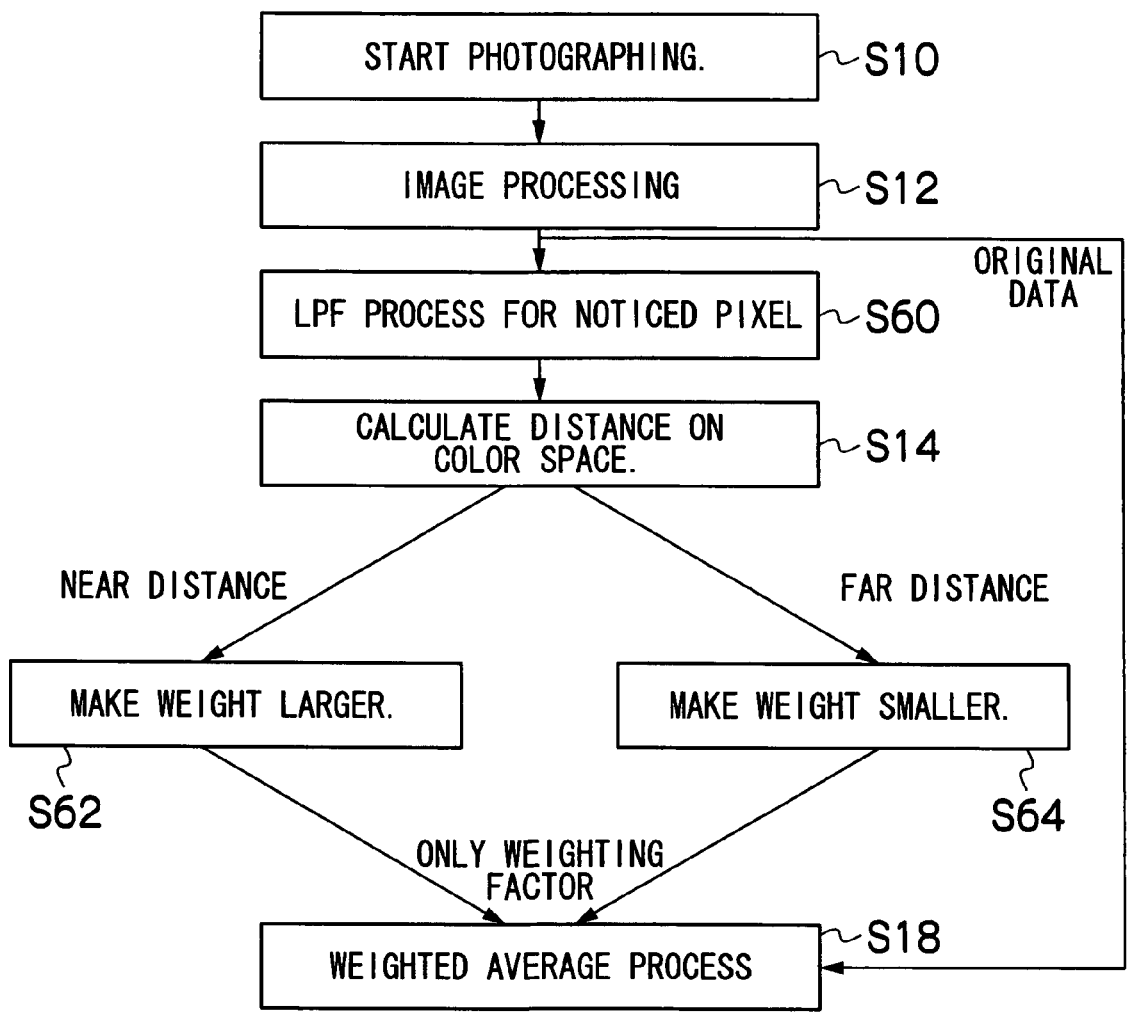

CALCULATE DISTANCE ON COLOR SPACE BY PAIRING R PIXEL WITH ADJACENT G PIXEL IN PROCESSING R PIXEL.

VAIR ARRAY

CALCULATE DISTANCE ON COLOR SPACE BY PAIRING R PIXEL WITH ADJACENT G PIXEL IN PROCESSING R PIXEL.

HONEYCOMB ARRAY

IMAGE PROCESSING DEVICE AND METHOD WITH DISTANCE CALCULATING ON COLOR SPACE

BACKGROUND OF THE INVENTION

1. Field of the Invention

The present invention relates to an image processing device and method, and more particularly to a technique for reducing the noise while preserving the edge of an image.

2. Description of the Related Art

Conventionally, this kind of image processing device is well known which employs an epsilon ($\epsilon$) filter (Japanese Patent Application Laid-Open No. 2001-118064, Japanese Patent Application Laid-Open No. 2003-8935, Japanese Patent Application Laid-Open No. 2004-159311).

The epsilon filter switches the filtering ON/OFF, depending on whether or not a level difference between the noticed pixel and its peripheral pixels is beyond a certain threshold value, and reduces the noise while preserving the edge of image.

SUMMARY OF THE INVENTION

However, there is a problem that the $\epsilon$ filter can not eliminate the noise fully if the threshold is set small, but deteriorates in preserving the edge of image, if the threshold is set large to apply a noise process strongly.

The invention has been achieved in the light of the above-mentioned circumstances, and it is an object of the invention to provide an image processing device and method that can reduce the noise having strong impulse while preserving the edge (detail) of image.

In order to accomplish the above object, according to a first aspect of the invention, there is provided an image processing device comprising an image input device for inputting image data representing a color image, a distance calculation device for calculating a distance on a color space between a noticed pixel of the inputted color image and each of peripheral pixels including the noticed pixel, a factor calculation device for calculating a weighting factor for each peripheral pixel in accordance with the calculated distance, and a weighted average processing device for calculating image data of the noticed pixel by obtaining a weighted average of image data of the peripheral pixels using the weighting factor calculated for each peripheral pixel.

That is, the level difference between the noticed pixel and each of its peripheral pixels is not calculated, but the distance on the color space between the noticed pixel and each of its peripheral pixels is calculated. The weighting factor for each peripheral pixel is calculated in accordance with the calculated distance on the color space. For example, the weighting factor for the peripheral pixel having nearer distance on the color space from the noticed pixel is larger, considering it more useful. The image data of the noticed pixel is calculated by obtaining a weighted average of image data of the peripheral pixels including the noticed pixel using the weighting factor for each peripheral pixel calculated in this manner. Thereby it is possible to preserve the edge of image while reducing the noise by calculating the weighting factor in accordance with the distance on the color space and obtaining a weighted average using the calculated factors.

According to a second aspect of the invention, there is provided the image processing device according to the first aspect, further comprising a processing range selection device for selecting any processing range from among a plurality of processing ranges, wherein the peripheral pixels including the noticed pixel are pixels within the selected processing range around the noticed pixel. The processing range selection device can select processing ranges depending on a taking condition and the like.

According to a third aspect of the invention, there is provided the image processing device according to the second aspect, wherein the processing range selection device selects a large processing range in processing a color image photographed at high sensitivity. Since the image photographed at high sensitivity contains a lot of noise, the large processing range is preferably set to intensify noise elimination.

According to a fourth aspect of the invention, there is provided the image processing device according to the second or third aspect, wherein the processing range selection device selects a small processing range in increasing the processing speed, or saving the power consumption. For example, it is required that the processing speed is higher in continuous shooting mode, and the processing amount is smaller in low power consumption mode, whereby the small processing range is selected.

According to a fifth aspect of the invention, there is provided the image processing device according to any one of the first to fourth aspects, wherein the factor calculation device calculates the weighting factors for the peripheral pixels for every color channel of the peripheral pixels.

For example, since the color noise is outstanding in high sensitivity photographing mode, the weighting factor of color difference data is made larger than the weighting factor of brightness data, if image data is composed of brightness data and color difference data. Thereby, it is possible to apply a strong noise elimination process for the specific channel with conspicuous noise.

According to a sixth aspect of the invention, there is provided the image processing device according to any one of the first to fifth aspects, wherein the factor calculation device calculates the weighting factors for the peripheral pixels that are different depending on the noise characteristic of the inputted color image.

For example, the weighting factors are switched depending on whether or not the noise characteristic of the color image is distributed uniformly, or the noise has a strong impulse (noise characteristic). In the former case, the weighting factor for the peripheral pixel having near distance on the color space is made larger for noise elimination. In the latter case, the weighting factor for the peripheral pixel having near distance on the color space is made smaller because it is likely affected by itself (noticed pixel).

According to a seventh aspect of the invention, there is provided the image processing device according to any one of the first to sixth aspects, further comprising a filtering processing device for performing a filtering process for the noticed pixel of the inputted color image, wherein the distance calculation device calculates the distance on the color space between the noticed pixel passed through the filtering process and each of the peripheral pixels including the noticed pixel not passed through the filtering process.

If a lot of noise component is contained in the noticed pixel itself, the color space distance for eliminating the noise of the noticed pixel can not be obtained excellently. Thus, the filtering process such as a low pass filter is performed for the noticed pixel before calculating the distance, and the distance is calculated based on the noticed pixel passed through the filtering process.

According to an eighth aspect of the invention, there is provided the image processing device according to any one of the first to seventh aspects, wherein the image input device inputs image data representing the color image unsynchronized corresponding to an array of a color filter from an image pickup element of a single plane type where the color filter of three primary colors is arranged, and the distance calculation device calculates the distance on the color space between the noticed pixel composed of a plurality of pixels and each of the peripheral pixels including the noticed pixel, using the plurality of proximate pixels having different colors as the noticed pixel at the same pixel position and the peripheral pixels including the noticed pixel.

Though the distance on the color space between the noticed pixel and its peripheral pixels can not be calculated for image data representing the unsynchronized color image, the distance on the color space can be calculated by regarding the plurality of proximate pixels having different colors as the noticed pixel at the same pixel position.

According to a ninth aspect of the invention, there is provided the image processing device according to the eighth aspect, further comprising a pixel position switching device for inputting image data representing the unsynchronized color image, capturing the plurality of proximate pixels having different colors as the same pixel position, and switching the pixel positions to capture the plurality of pixels in accordance with a pattern of the color filter for the image pickup element of single plane type to make the same organization of color pixels within the plurality of pixels, regardless of the pattern of the color filter.

Thereby, the organization of color pixels (array of pixels) within the plurality of pixels after switching the pixel positions can be the same, regardless of the pattern of the color filter for the image pickup element of single plane type, whereby the processing at the latter stage can be common.

According to a tenth aspect of the invention, there is provided the image processing device according to any one of the first to ninth aspects, further comprising a noise component acquisition device for acquiring, as a noise component, a difference between image data representing the color image before image processing that is inputted by the image input device and image data representing the color image after image processing that is calculated by the weighted average processing device, a nonlinear conversion device for making the nonlinear conversion of the acquired noise component, and a subtraction device for subtracting the noise component subjected to the nonlinear conversion from the image data representing the color image before image processing.

The noise component contained in the original image data is acquired by calculating a difference between original image data and image data after image processing that is calculated by the weighted average processing device. The nonlinear conversion is performed for this noise component, so that the strong noise is left behind and the weak noise is eliminated, for example. And only the strong noise is eliminated from the original image data by subtracting the noise component subjected to the nonlinear conversion from original image data.

According to an eleventh aspect of the invention, there is provided the image processing device according to a tenth aspect, wherein the nonlinear conversion device eliminates only the noise component at small level from the noise component.

According to a twelfth aspect of the invention, there is provided an image processing device comprising an image input device for inputting image data representing a color image in a first color space, a first distance calculation device for calculating a first distance on the first color space between a first noticed pixel of the inputted color image and each of the peripheral pixels including the first noticed pixel, a first factor calculation device for calculating a first weighting factor for each peripheral pixel in accordance with the calculated first distance, a first weighted average processing device for calculating image data of the first noticed pixel by obtaining a weighted average of image data of the peripheral pixels, using the first weighting factor calculated for each peripheral pixel, a conversion processing device for converting image data representing the color image in the first color space subjected to the first weighted average processing into image data representing a color image in a second color space, a second distance calculation device for calculating a second distance on the second color space between the second noticed pixel of the converted color image and each of peripheral pixels including the second noticed pixel, a second factor calculation device for calculating a second weighting factor for each peripheral pixel in accordance with the calculated second distance, and a second weighted average processing device for calculating image data of the second noticed pixel by obtaining a weighted average of image data of the peripheral pixels, using the second weighting factor calculated for each peripheral pixel.

That is, the image processing for noise reduction is performed for the color image in the first color space that is inputted by the image input device in the same manner as in the first aspect, the color image subjected to the image processing is converted into the second color space, and the same image processing for noise reduction as above is performed again for the converted color image in the second color space. Thereby, the noise at the time of photographing and the noise emphasized by the processing system can be isolated and controlled.

According to a thirteenth aspect of the invention, there is provided the image processing device according to the twelfth aspect, wherein the first color space is an RGB space, and the second color space is a YUV space.

According to a fourteenth aspect of the invention, there is provided the image processing device according to the twelfth or thirteenth aspect, wherein the first and second factor calculation device calculates the weighting factors for the peripheral pixels that are different depending on the noise characteristic of the inputted color image.

According to a fifteenth aspect of the invention, there is provided an image processing method comprising a step of inputting image data representing a color image, a step of calculating a distance on a color space between a noticed pixel of the inputted color image and each of the peripheral pixels including the noticed pixel, a step of calculating the weighting factor for each peripheral pixel in accordance with the calculated distance, and a step of calculating image data of the noticed pixel by obtaining a weighted average of image data of the peripheral pixels using the weighting factor calculated for each peripheral pixel.

According to a sixteenth aspect of the invention, there is provided the image processing method according to the fifteenth aspect, further comprising a step of selecting any processing range from among a plurality of processing ranges, wherein the peripheral pixels including the noticed pixel in calculating the distance on the color space are pixels within the selected processing range around the noticed pixel.

According to a seventeenth aspect of the invention, there is provided the image processing method according to the sixteenth aspect, wherein the step of selecting the processing range comprises selecting a large processing range in processing the color image photographed at high sensitivity.

According to an eighteenth aspect of the invention, there is provided the image processing method according to the sixteenth or seventeenth aspect, wherein the step of selecting the processing range comprises selecting a small processing range in increasing the processing speed, or saving the power consumption.

According to a nineteenth aspect of the invention, there is provided the image processing method according to any one of the fifteenth to eighteenth aspects, wherein the step of calculating the weighting factor comprises calculating the weighting factors for the peripheral pixels for each color channel of the peripheral pixels.

According to a twentieth aspect of the invention, there is provided the image processing method according to any one of the fifteenth to nineteenth aspects, wherein the step of calculating the weighting factor comprises reducing the weighting factor for the peripheral pixel in which the calculated distance is near distance, if the noise of the color image is large depending on the noise characteristic of the inputted color image.

According to a twenty-first aspect of the invention, there is provided the image processing method according to any one of the fifteenth to twentieth aspects, further comprising a step of making a filtering process for the noticed pixel of the inputted color image, wherein the step of calculating the distance comprises calculating the distance on the color space between the noticed pixel subjected to the filtering process and each of the peripheral pixels including the noticed pixel not subjected to the filtering process.

According to a twenty-second aspect of the invention, there is provided the image processing method according to any one of the fifteenth to twenty-first aspects, wherein the step of inputting the image data comprises inputting image data representing a color image unsynchronized corresponding to an array of a color filter from an image pickup element of a single plane type where the color filter of three primary colors is arranged, and the step of calculating the distance comprises calculating the distance on the color space between the noticed pixel composed of a plurality of pixels and each of the peripheral pixels including the noticed pixel, using the plurality of proximate pixels having different colors as the noticed pixel at the same pixel position and the peripheral pixels including the noticed pixel.

According to a twenty-third aspect of the invention, there is provided the image processing method according to the twenty-second aspect, further comprising a step of inputting image data representing the unsynchronized color image, capturing the plurality of proximate pixels having different colors as the same pixel position, and switching the pixel positions to capture the plurality of pixels in accordance with a pattern of the color filter for the image pickup element of single plane type to make the same organization of color pixels within the plurality of pixels, regardless of the pattern of the color filter.

According to a twenty-fourth aspect of the invention, there is provided the image processing method according to any one of the fifteen th to twenty-third aspects, further comprising a step of acquiring, as a noise component, a difference between image data representing the color image before image processing that is inputted by the image input device and image data representing the color image after image processing that is calculated by the weighted average processing device, a step of making the nonlinear conversion of the acquired noise component, and a step of subtracting the noise component subjected to the nonlinear conversion from the image data representing the color image before image processing.

According to a twenty-fifth aspect of the invention, there is provided the image processing method according to the twenty-fourth aspect, wherein the nonlinear conversion step comprises eliminating only the noise component at small level from the noise component.

According to a twenty-sixth aspect of the invention, there is provided an image processing method comprising a step of inputting image data representing a color image in a first color space, a step of calculating a first distance on the first color space between a first noticed pixel of the inputted color image and each of peripheral pixels including the first noticed pixel, a step of calculating a first weighting factor for each peripheral pixel in accordance with the calculated first distance, a step of calculating image data of the first noticed pixel by obtaining a weighted average of image data of the peripheral pixels using the first weighting factor calculated for each peripheral pixel, a step of converting image data representing the color image in the first color space subjected to the first weighted average processing into image data representing a color image in a second color space, a step of calculating a second distance on the second color space between a second noticed pixel of the converted color image and each of peripheral pixels including the second noticed pixel, a step of calculating a second weighting factor for each peripheral pixel in accordance with the calculated second distance, and a step of calculating image data of the second noticed pixel by obtaining a weighted average of image data of the peripheral pixels using the second weighting factor calculated for each peripheral pixel.

According to a twenty-seventh aspect of the invention, there is provided the image processing method according to the twenty-sixth aspect, wherein the first color space is an RGB space, and the second color space is a YUV space.

According to a twenty-eighth aspect of the invention, there is provided the image processing method according to the twenty-sixth or twenty-seventh aspect, further comprising a step of performing an edge enhancement process for only brightness data of image data representing the converted color image in the second color space before calculating the second distance, wherein the step of calculating the second weighting factor comprises making the weighting factor for brightness data larger than the weighting factor for color difference data.

With the invention, the image data of the noticed pixel is calculated by calculating the weighting factor in accordance with the distance on the color space between the noticed pixel and each of its peripheral pixels, and obtaining a weighted average of image data of the peripheral pixels using the calculated factors, whereby it is possible to preserve the edge of image while reducing the noise favorably.

BRIEF DESCRIPTION OF THE DRAWINGS

FIGS. 1A to 1D are views for explaining a concept of an image processing method according to the present invention;

FIG. 2 is an essential block diagram of an image pickup apparatus having an image processing device according to a first embodiment of the invention;

FIG. 3 is a diagram for explaining a distance calculation circuit of FIG. 1;

FIG. 4 is a graph showing the relationship between the distance on color space and the weighting factor;

FIG. 5 is a flowchart showing an operation procedure of the image pickup apparatus having the image processing device according to the first embodiment;

FIG. 15 is a graph showing the relationship between the distance on color space and the weighting factor with the pixel in the middle distance emphasized;

FIG. 19 is a flowchart showing an operation procedure of the image pickup apparatus having the image processing device according to the sixth embodiment;

DETAILED DESCRIPTION OF THE PREFERRED EMBODIMENTS

Figure 6:
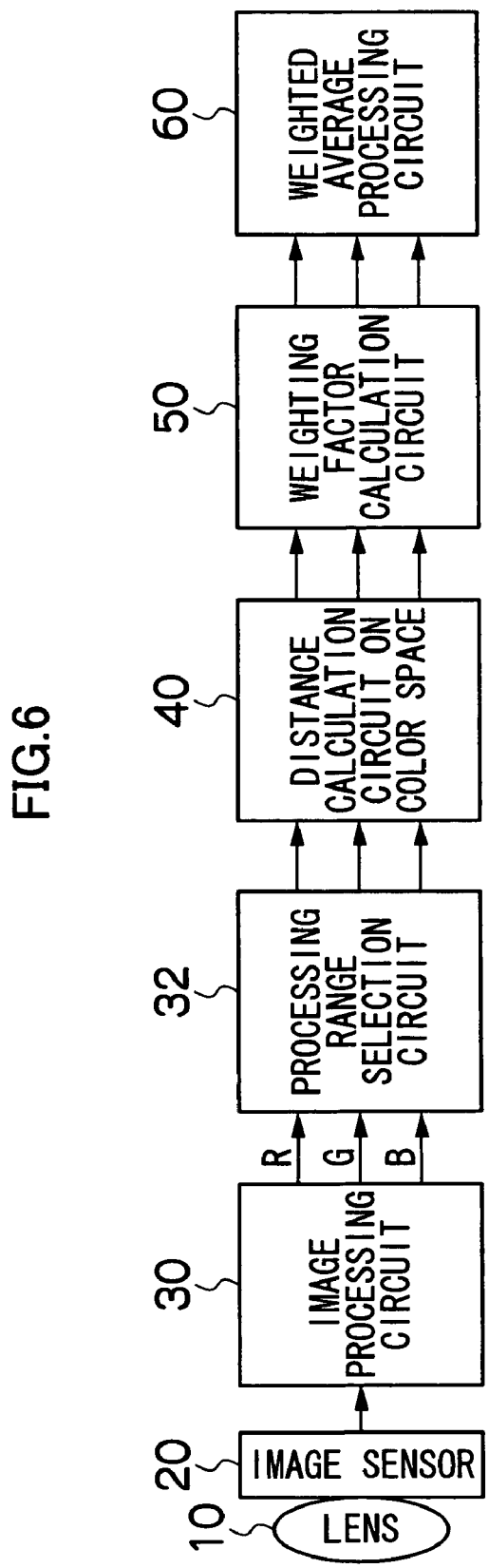
FIG. 6 is an essential block diagram of an image pickup apparatus having an image processing device according to a second embodiment of the invention.

The preferred embodiments of an image processing device and method according to the present invention will be described below with reference to the accompanying drawings.

[Concept of Image Processing Method According to the Invention]

FIG. 1 shows a concept of the image processing method according to the invention. Now, image data in any processing range (range of 5×5 pixels in FIG. 1A) is taken out of a color image of R, G and B.

All the pixels (25 pixels) taken out in this processing range are plotted on an RGB color space (FIG. 1B).

If the taken-out processing range is a flat image (each pixel has the same lightness, hue and saturation), data plotted on the color space are dispersed in a similar form to the normal distribution. Supposing that this dispersion is noise, the noise can be reduced by making the dispersion smaller.

Since the noise has a dispersion similar to the normal distribution on the color space, data density is highest at a center of the dispersion, and the density is lower farther away from the center. Supposing that the central pixel in the taken-out processing range is a noticed pixel 1 to utilize this feature, the distance between the noticed pixel 1 and each of all the pixels (including the noticed pixel 1) within the processing range is calculated (FIG. 1C).

The pixel having the nearer distance on the color space to the noticed pixel 1 has a larger weight because it is more useful. For all the pixels, the weighting factors corresponding to the distance are calculated, and image data of the noticed pixel 1 is calculated by obtaining a weighted average of image data of 25 pixels using the calculated factors.

Thereby, the noticed pixel 1 can be made closer to a region with higher density on the color space and near the noticed pixel 1 (FIG. 1C), and the same process is performed for all the pixels while shifting the noticed pixel 1, so that the dispersion over the entire image can be made smaller (the noise is reduced) (FIG. 1D).

Also, when the processing range is on the edge, data plotted on the color space is divided into a plurality of pixel groups (a plurality of clusters). Now, when the noticed pixel 1 belongs to a certain cluster, the pixel making up the cluster has the smaller distance to the noticed pixel 1 and therefore the larger weighting factor, and the pixel making up the other cluster has the larger distance to the noticed pixel 1 and therefore the smaller weighting factor, so that the noticed pixel 1 of the weighted average preserves the edge without being smoothed.

First Embodiment

FIG. 2 is an essential block diagram of an image pickup apparatus having an image processing device according to a first embodiment of the invention.

The image pickup apparatus mainly comprises a photographing lens 10, an image sensor 20, an image processing circuit 30, a distance calculation circuit 40, a weighting factor calculation circuit 50, and a weighted average processing circuit 60.

An optical image representing the subject is formed via the photographing lens 10 on a light receiving surface of the image sensor 20. The image sensor 20 is a color image sensor (CCD image sensor) of single plane type with a predetermined color filter array (e.g., vair array, honeycomb array, G stripe R/G complete mosaic, etc.).

The light incident on the light receiving surface of the image sensor 20 via the photographing lens 10 is converted into a signal charge corresponding to the quantity of incident light by each of the photodiodes arranged on the light receiving surface. And the signal charge accumulated in each photodiode is read in accordance with a timing signal applied from a timing generator, not shown, and sequentially outputted as a voltage signal (image signal) from the image sensor 20.

An analog image signal of RGB read from the image sensor 20 is converted into digital image data of RGB, and passed through various image processes by the image processing circuit 30. That is, the image signal processing part 30 comprises a linear matrix circuit, a white balance correction circuit, a gamma correction circuit, and a synchronization circuit, in which image data of RGB is processed by these circuits.

The image data of RGB, after pixel interpolation, is aligned at the same pixel position by the synchronization circuit of the image processing circuit 30, and applied to a distance calculation circuit 40 for calculating the distance on color space.

The distance calculation circuit 40 calculates the distance on the RGB color space between the noticed pixel and each of its peripheral pixels 1, 2, 3, ..., 25, as shown in FIG. 3, using image data of RGB in the processing area of 5×5 pixels around the noticed pixel, as shown in FIG. 1A. The peripheral pixels are 25 (=5×5) pixels including the noticed pixel.

The weighting factor calculation circuit 50 calculates the weighting factor corresponding to the peripheral pixel in accordance with the distance on the color space calculated for each peripheral pixel.

FIG. 4 is a graph showing the relationship between the distance on color space and the weighting factor. In this example of graph, the weighting factor calculation circuit 50 calculates the weighting factors of the peripheral pixels such that the peripheral pixel having nearer distance to the noticed pixel has the larger weighting factor, and the peripheral pixel having farther distance to the noticed pixel has the smaller weighting factor. The weighting factor calculation circuit 50 may calculate the weighting factors by storing a function representing the graph of FIG. 4 and substituting the distance on color space into this function, or read the weighting factor corresponding to the distance on color space from a look-up table (LUT) storing the input/output relation indicated in the graph of FIG. 4.

The weighted average processing circuit 60 obtains a weighted average of the pixel values of the peripheral pixels, using the weighting factor for each peripheral pixel calculated by the weighting factor calculation circuit 50, and calculates the pixel value of the noticed pixel after the noise elimination process. Now, assuming that the position of the noticed pixel on the image is (x, y), the weighted average processing circuit 60 performs the arithmetical operation of the following formula.

$$\text{Pixel value after processing}(x, y) = \frac{\Sigma \text{Weighting factor}(x+i, y+j) \times \text{Pixel value}(x+i, y+j)}{\Sigma \text{Weighting factor}(x+i, y+j)}$$ [Formula 1]

Where $-2 \leq i \leq 2, -2 \leq j \leq 2$

The above operation is performed for each RGB of the noticed pixel, in which the weighting factor is the same for each color of RGB.

The distance calculation circuit 40, the weighting factor calculation circuit 50 and the weighted average processing circuit 60 perform the process for all the pixels of the color image, while shifting the position (x, y) of the noticed pixel on the image.

In this manner, the image data of RGB passed through the noise reduction process is converted into brightness data Y and color difference data Cr, Cb by a YUV conversion circuit, not shown, compressed into the image data compressed in a predetermined format (e.g., JPEG format), and recorded on the recording medium (e.g., xD picture card, etc.).

The image sensor 20 of this embodiment is the color image sensor of single plane type, but instead, may be the image sensor of three plate type for RGB. In this case, it is unnecessary to synchronize image data of RGB.

FIG. 5 is a flowchart showing an operation procedure of the image pickup apparatus having the image processing device according to the first embodiment.

In FIG. 5, the picture is taken in synchronism with the operation of a shutter button, whereby an analog image signal of RGB is acquired from the image sensor 20 (step S10). Then, the analog image signal of RGB is converted into digital image data of RGB, and subjected to the image processing such as a linear matrix process, white balance correction, gamma correction and a synchronization process (step S12).

The processing area of 5×5 pixels around the noticed pixel is taken in from image data of RGB after the image processing, and the distance on the RGB color space between the noticed pixel and each of its peripheral pixels is calculated (step S14).

Then, the weighting factor for each peripheral pixel is calculated in accordance with the distance on the color space calculated at step S14 (step S16).

Lastly, a weighted average of the pixel values of the peripheral pixels is obtained, using the calculated weighting factor for each peripheral pixel, and its processing result is made the pixel value of the noticed pixel (step S18).

Second Embodiment

FIG. 6 is an essential block diagram of an image pickup apparatus having an image processing device according to a second embodiment of the invention. The common parts to the first embodiment as shown in FIG. 1 are designated by the same signs, and not described in detail here.

The image pickup apparatus of the second embodiment as shown in FIG. 6 is different from the image pickup apparatus of the first embodiment as shown in FIG. 2 in that a processing range selection circuit 32 is additionally provided between the image processing circuit 30 and the distance calculation circuit 40.

The processing range selection circuit 32 selects the processing range for use in performing the weighted average process according to the invention, or selects any processing range from among a plurality of processing ranges having different sizes based on the photographing mode and the photographing conditions.

That is, in making the high sensitivity photographing because the subject is dark, the gain of image signal is increased, so that the noise is increased. Accordingly, the processing range selection circuit 32 selects the large processing range at the time of high sensitivity photographing. By increasing the processing range, the noise reduction process for the noticed pixel can be performed, using information of the peripheral pixels in the wider range, whereby the large noise reduction effect can be attained.

To increase the processing speed in a continuous shooting mode, and to decrease the processing amount in a low power consumption mode, the processing range selection circuit 32 selects a small processing range.

Figure 7:
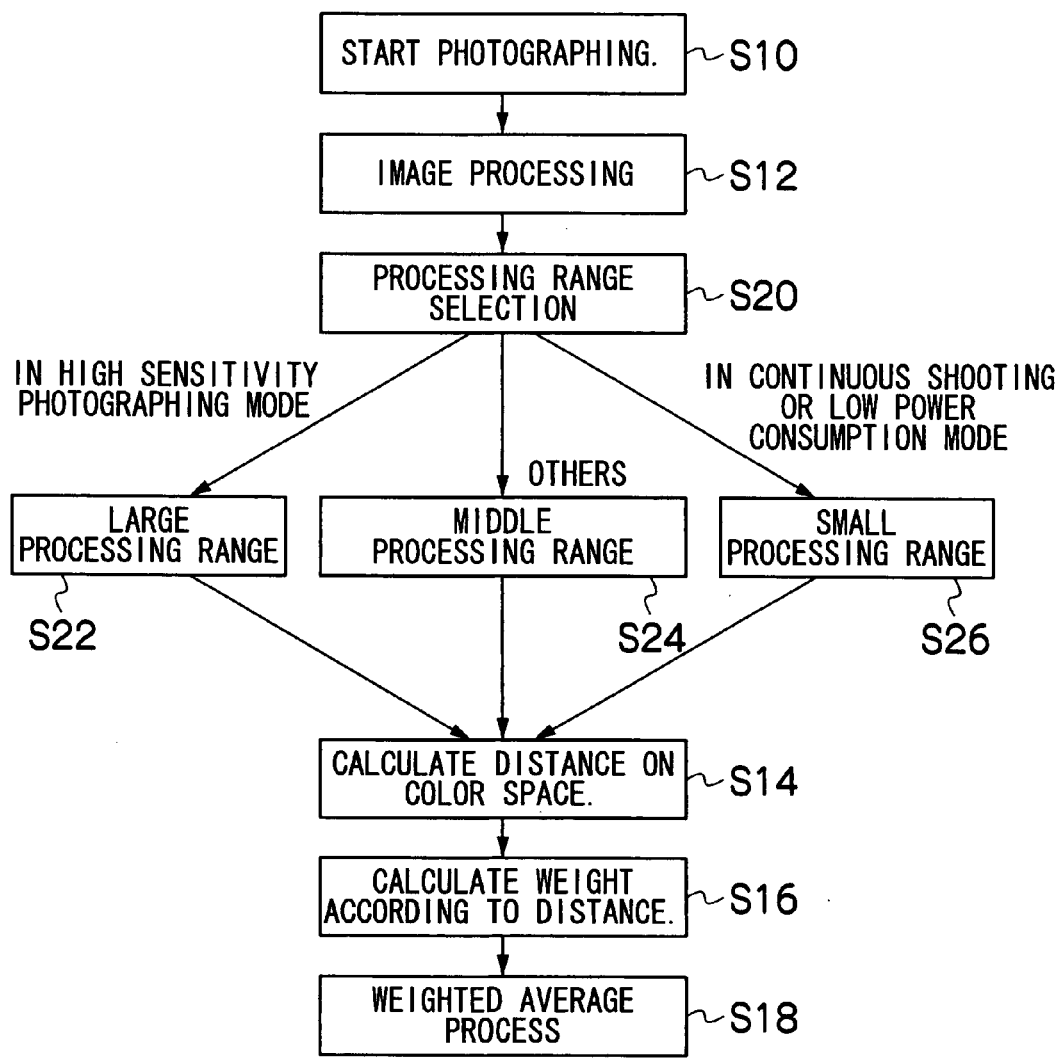
FIG. 7 is a flowchart showing an operation procedure of the image pickup apparatus having the image processing device according to the second embodiment.

FIG. 7 is a flowchart showing an operation procedure of the image pickup apparatus having the image processing device according to the second embodiment. The common processing steps to the flowchart as shown in FIG. 5 are designated by the same step numbers, and not described in detail here.

The steps S20 to S26 for selecting the processing range are additionally provided between step S12 and step S14, as shown in FIG. 7.

At step S20, any processing range is selected from among a plurality of (large, middle and small) processing ranges based on the photographing mode and the photographing conditions. That is, a large processing range is selected at the time of high sensitivity photographing, and data of pixels within the processing range is passed to step S14 at latter stage (step S22). In the continuous shooting mode and the low power consumption mode, a small processing range is selected and data of pixels within the processing range is passed to step S14 (step S26). In other cases, a middle (normal) processing range is selected and data of pixels within the processing range is passed to step S14 (step S24).

If the normal (middle) processing range is the range of 5×5 pixels, the large processing range is the range of 9×9 pixels, and the small processing range is the range of 3×3 pixels. Also, the kind and size of the processing range are not limited to this embodiment, but may be appropriately selected.

Third Embodiment

Figure 8:
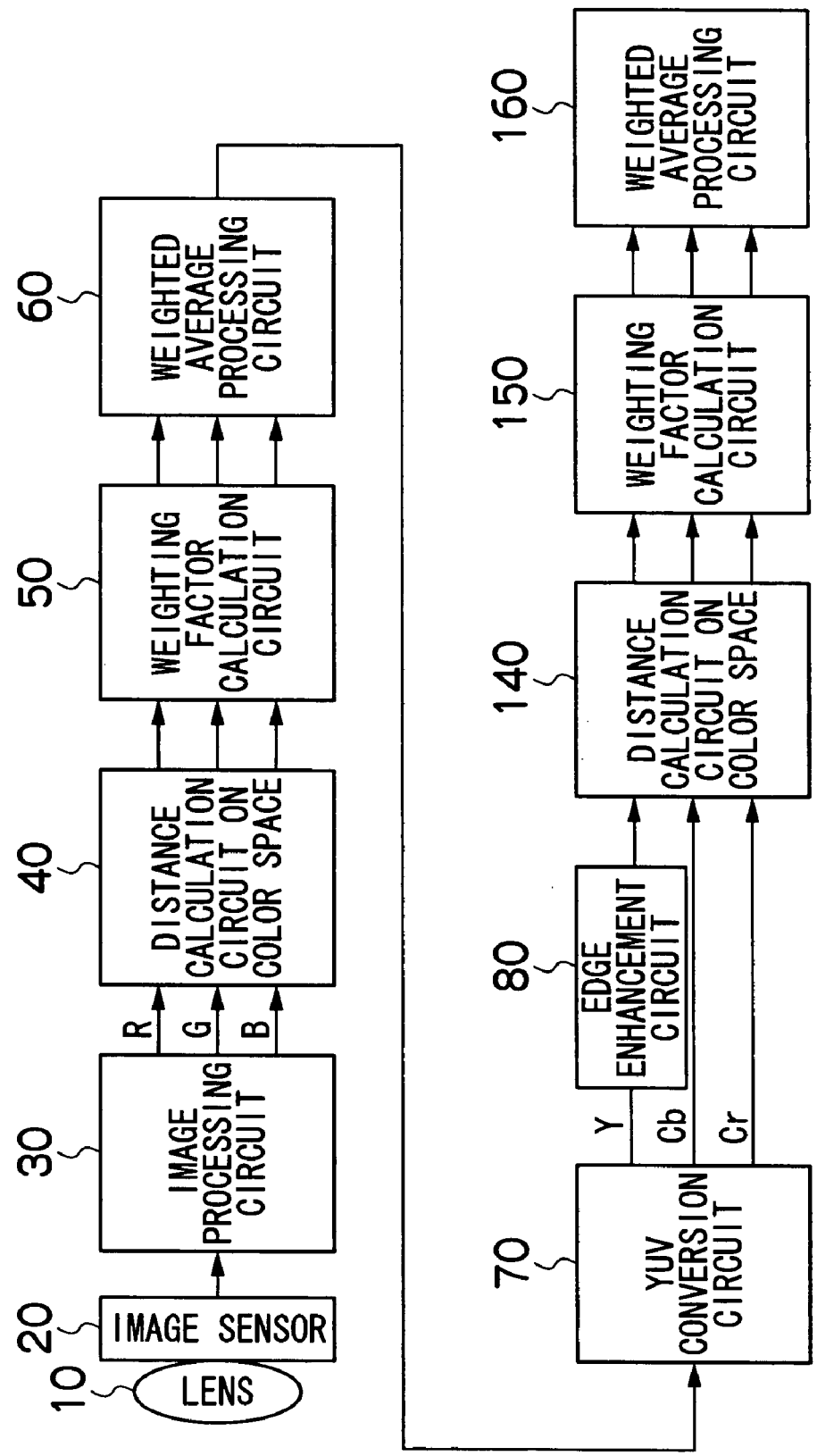
FIG. 8 is an essential block diagram of an image pickup apparatus having an image processing device according to a third embodiment of the invention.

FIG. 8 is an essential block diagram of an image pickup apparatus having an image processing device according to a third embodiment of the invention. The common parts to the first embodiment as shown in FIG. 1 are designated by the same signs, and not described in detail here.

The image pickup apparatus of the third embodiment as shown in FIG. 8 is different from the image pickup apparatus of the first embodiment as shown in FIG. 2 in that a distance calculation circuit 140, a weighting factor calculation circuit 150 and a weighted average processing circuit 160 are additionally provided.

That is, the image data of RGB composed of weighted average obtained by the weighted average processing circuit 60 is applied to the YUV conversion circuit 70.

The YUV conversion circuit 70 converts the inputted image data of RGB into brightness data Y and color difference data Cr, Cb. An edge enhancement circuit 80 makes an edge enhancement (contour enhancement) process for brightness data Y inputted from the YUV conversion circuit 70.

The YUV conversion circuit 70 and the edge enhancement circuit 80 are also provided for the image pickup apparatus of the first embodiment, but these circuits are omitted in FIG. 2.

The brightness data Y with edge enhanced by the edge enhancement circuit 80 has greater noise than before edge enhancement. Thus, the noise reduction process on the color space (YUV color space), which is different from the noise reduction process by the distance calculation circuit 40, the weighting factor calculation circuit 50 and the weighted average processing circuit 60 at the former stage, is performed by the distance calculation circuit 140, the weighting factor calculation circuit 150 and the weighted average processing circuit 160 at the latter stage. Since the noise reduction processes are performed in the different color spaces, the different noises having different characteristics after the enhancement processes can be individually treated.

That is, the distance calculation circuit 140 calculates the distance on color space between the noticed pixel and each of its peripheral pixels, like the distance calculation circuit 40. However, the distance calculation circuit 40 calculates the distance on the RGB color space, whereas the distance calculation circuit 140 calculates the distance on the YUV color space.

The weighting factor calculation circuit 150 calculates the weighting factors corresponding to its peripheral pixels in accordance with the distance on the YUV color space calculated for each peripheral pixel.

The weighted average processing circuit 160 obtains a weighted average of the pixel values of the peripheral pixels, using the weighting factor for each peripheral pixel calculated by the weighting factor calculation circuit 150, in which its processing result is made the pixel value of the noticed pixel.

Figure 9:
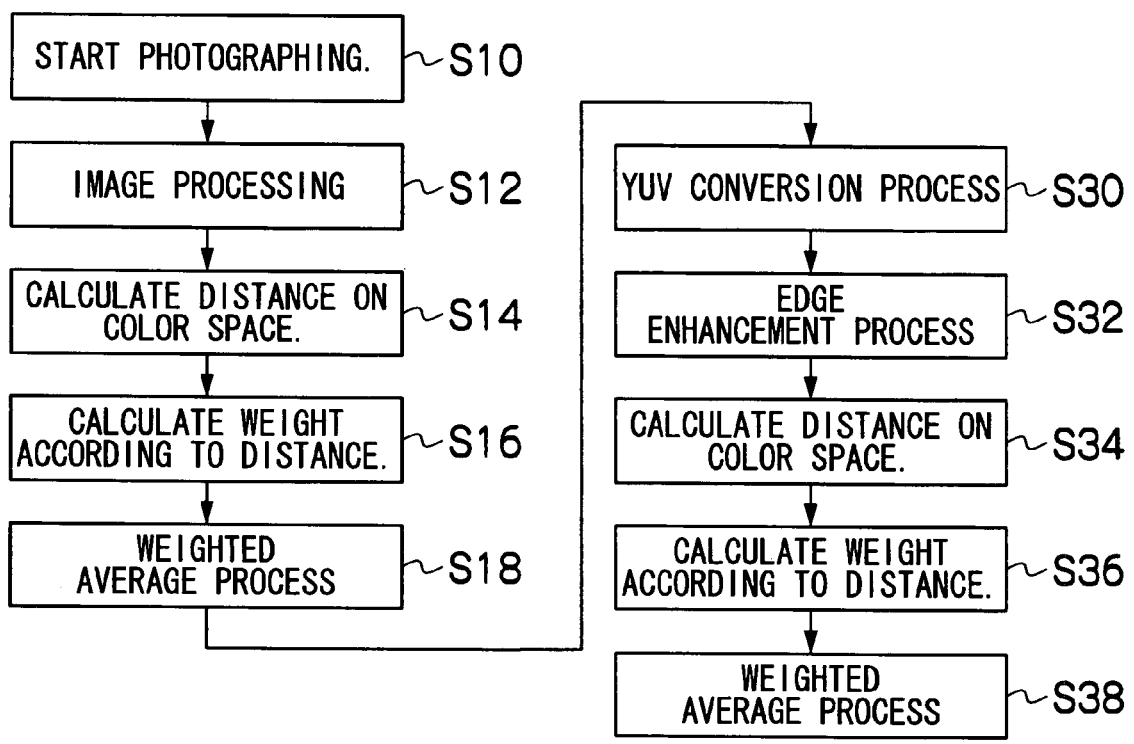
FIG. 9 is a flowchart showing an operation procedure of the image pickup apparatus having the image processing device according to the third embodiment.

FIG. 9 is a flowchart showing an operation procedure of the image pickup apparatus having the image processing device according to the third embodiment. The common processing steps to the flowchart as shown in FIG. 5 are designated by the same step numbers, and not described in detail here.

The noise reduction process in the RGB color space is performed by the processing from steps S14 to S18, as shown in FIG. 9.

The image data of RGB after this noise reduction process is YUV converted into brightness data Y and color difference data Cr, Cb (step S30). Then, the edge enhancement process is performed for the brightness data Y (step S32).

Then, the processing area of 5×5 pixels around the noticed pixel is taken in from the image data of YUV, and the distance on the YUV color space between the noticed pixel and each of its peripheral pixels is calculated (step S34).

Then, the weighting factor for each peripheral pixel is calculated in accordance with the distance on the YUV color space calculated at step S34 (step S36).

Lastly, a weighted average of the pixel values of the peripheral pixels is obtained, using the calculated weighting factor for each peripheral pixel, in which its processing result is made the pixel value of the noticed pixel (step S38).

Fourth Embodiment

Figure 10:
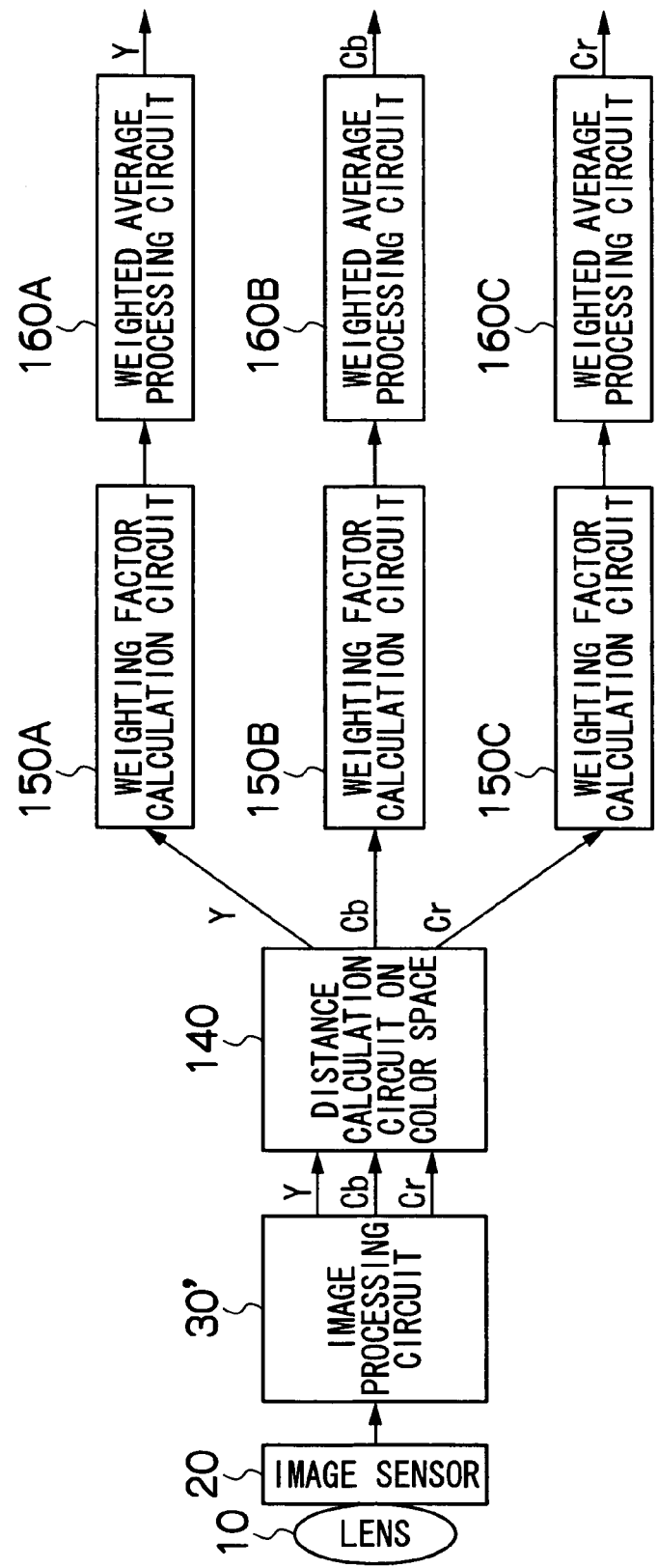
FIG. 10 is an essential block diagram of an image pickup apparatus having an image processing device according to a fourth embodiment of the invention.

FIG. 10 is an essential block diagram of an image pickup apparatus having an image processing device according to a fourth embodiment of the invention. The common parts to the first and third embodiments as shown in FIGS. 2 and 8 are designated by the same signs, and not described in detail here.

An image processing circuit 30' for the image pickup apparatus of the fourth embodiment as shown in FIG. 10 is the same as the image processing circuit 30 of the first embodiment in performing the linear matrix process, white balance correction, gamma correction and the synchronization process. However, this image processing circuit 30' further comprises a process for converting the synchronized image data of RGB into brightness data Y and color difference data Cr, Cb in the YUV color space.

The distance calculation circuit 140 calculates the distance on the YUV color space between the noticed pixel and each of its peripheral pixels from inputted brightness data Y and color difference data Cr, Cb on the YUV color space.

The weighting factor calculation circuits 150A, 150B and 150C calculate the weighting factor for each of brightness data Y and color difference data Cb, Cr. That is, the different weighting factor can be set for each color channel, and controlled, using the noise characteristic for each color channel. For example, since the color noise is outstanding at the time of high sensitivity photographing, the weighting factor for color difference data Cb, Cr is made larger than usually.

Figure 11:
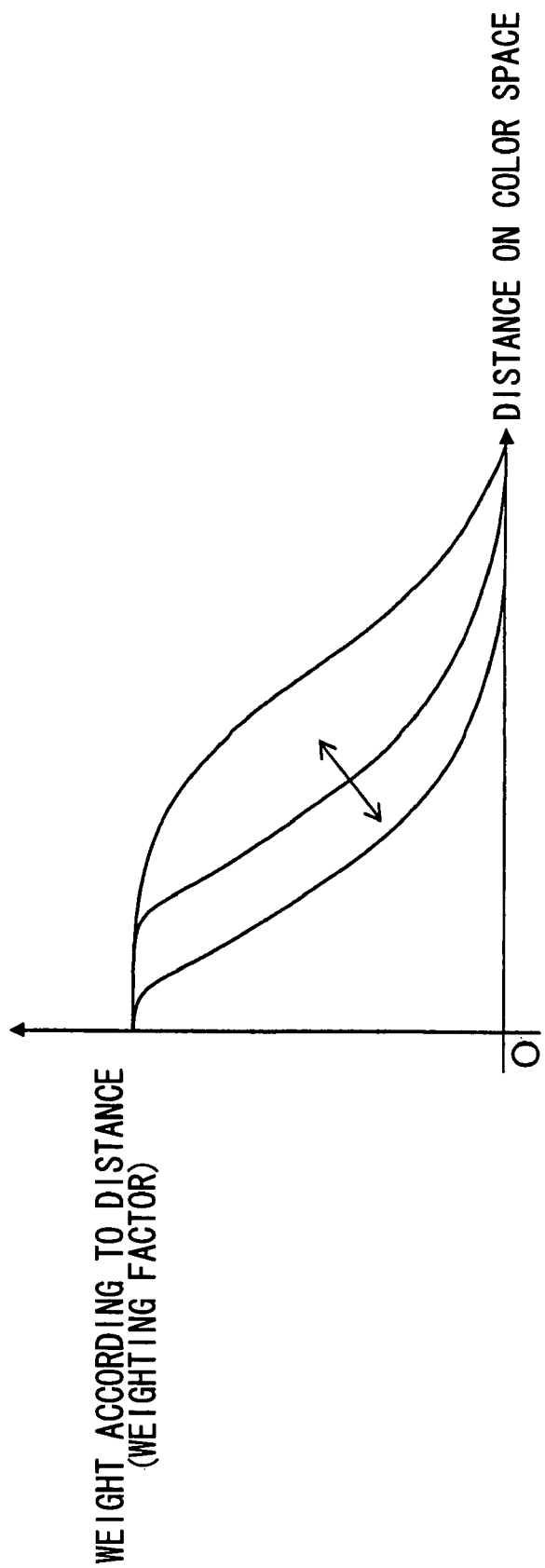
FIG. 11 is a graph showing the relationship between the distance on color space and a plurality of weighting factors.

FIG. 11 shows one example of the weighting factor with respect to the distance on color space when the weighting factor is made larger or smaller.

A weighted average processing circuit 160A obtains a weighted average of the pixel values of brightness data Y for the peripheral pixels, using the weighting factor for each peripheral pixel calculated by a weighting factor calculation circuit 150A, in which the pixel value of brightness data Y of the noticed pixel after the noise elimination process is calculated.

Similarly, the weighted average processing circuits 160B, 160C obtain a weighted average of the pixel values of color difference data Cb, Cr for the peripheral pixels, using the weighting factor for each peripheral pixel calculated by the weighting factor calculation circuits 150B, 150C, in which the pixel values of color difference data Cb, Cr of the noticed pixel after the noise elimination process are calculated.

Figure 12:
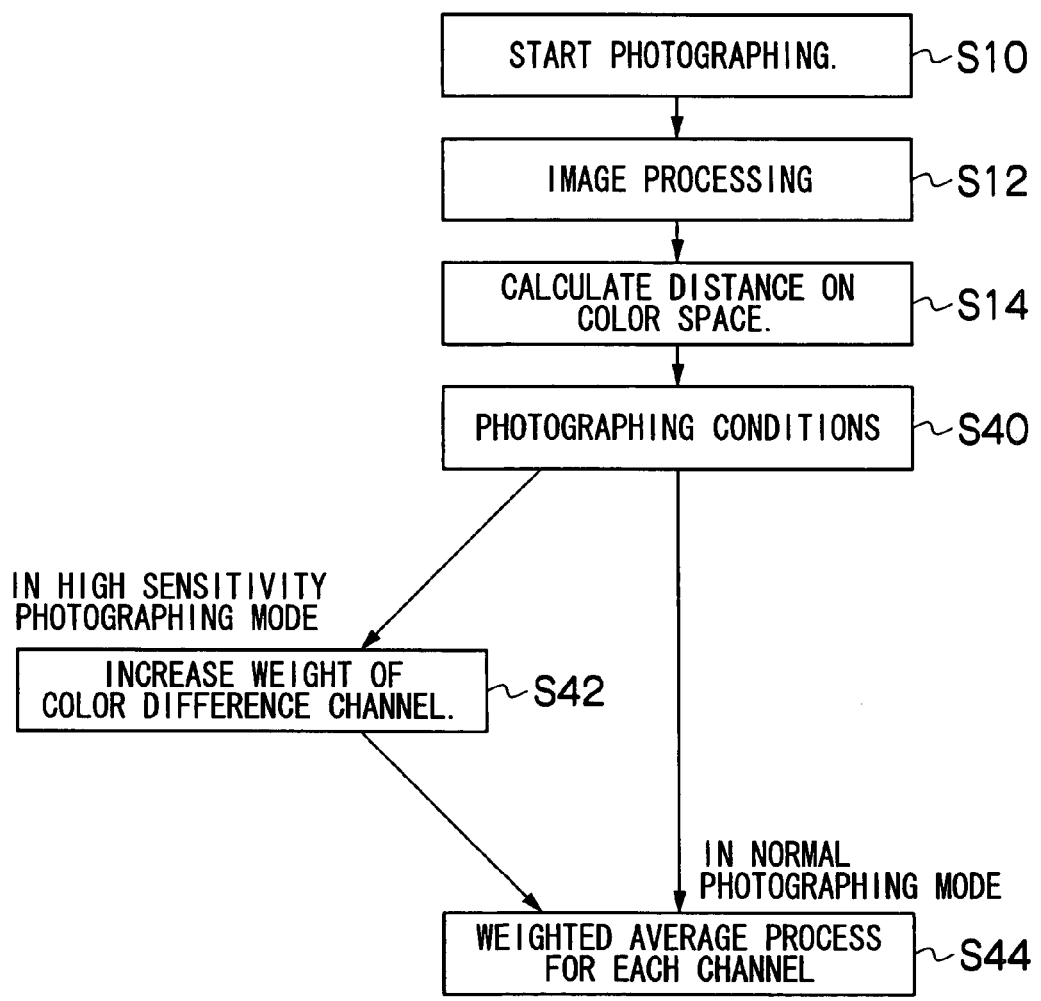
FIG. 12 is a flowchart showing an operation procedure of the image pickup apparatus having the image processing device according to the fourth embodiment.

FIG. 12 is a flowchart showing an operation procedure of the image pickup apparatus having the image processing device according to the fourth embodiment. The common processing steps to the flowchart as shown in FIG. 5 are designated by the same step numbers, and not described in detail here.

The distance on the YUV color space between the noticed pixel and each of its peripheral pixels is calculated at step S14, as shown in FIG. 12. Then, whether the photographing condition is high sensitivity photographing or not is discriminated (step S40). And the weighting factor is calculated so that the weighting factor for the color difference channel (color difference data Cb, Cr) may be larger during the high sensitivity photographing, or without changing the weighting factor for each color channel during the normal photographing (step S42).

Lastly, a weighted average of the pixel values of the peripheral pixels is obtained for each color channel, using the calculated weighting factor for each peripheral pixel (weighting factor for each color channel), in which its processing result is made the pixel value of the noticed pixel (step S44).

If the edge enhancement process is performed for the brightness data Y, the noise of brightness data Y is increased, whereby during the normal photographing, the weighting factor for brightness data Y may be set larger than the weighting factor for color difference data Cb, Cr.

Fifth Embodiment

Figure 13:
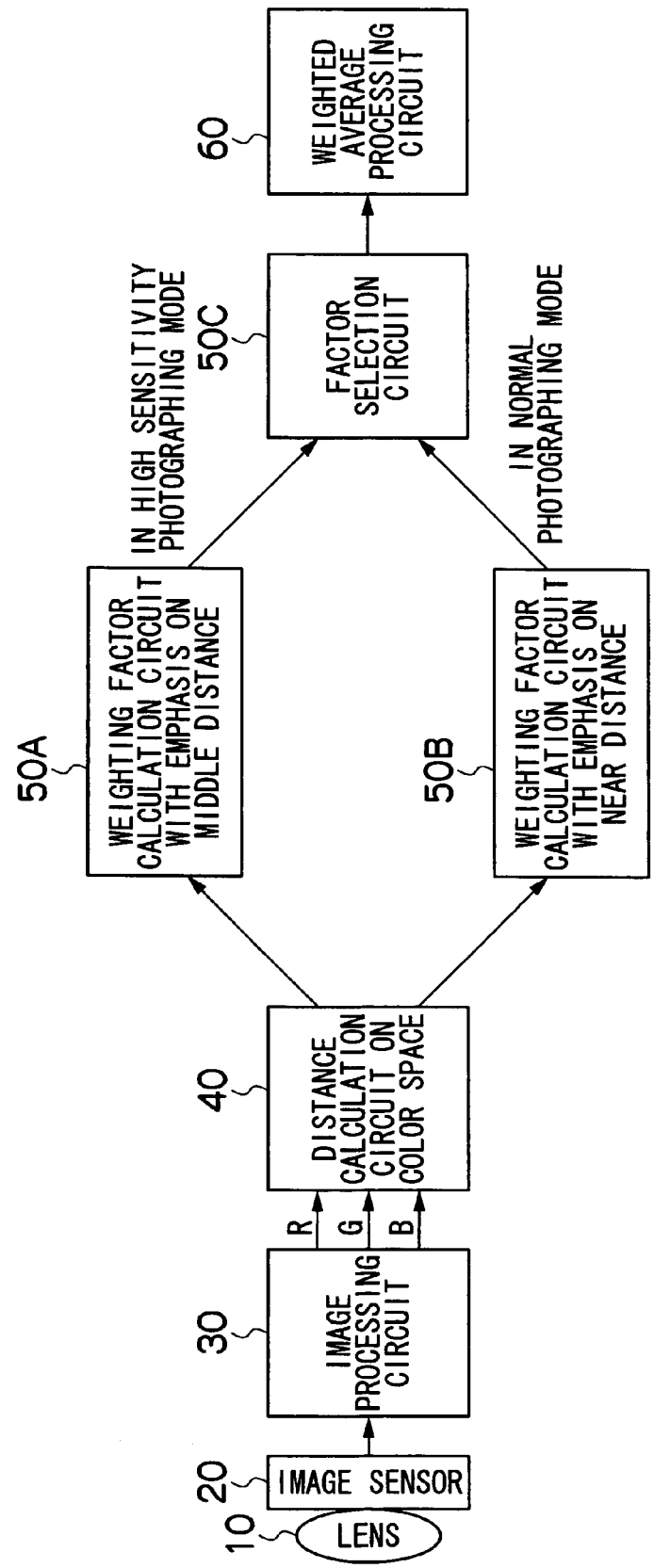
FIG. 13 is an essential block diagram of an image pickup apparatus having an image processing device according to a fifth embodiment of the invention.

FIG. 13 is an essential block diagram of an image pickup apparatus having an image processing device according to a fifth embodiment of the invention. The common parts to the first embodiment as shown in FIG. 2 are designated by the same signs, and not described in detail here.

The image pickup apparatus of the fifth embodiment as shown in FIG. 13 is different from the first embodiment in that the weighting factor calculation circuits 50A, 50B and a factor selection circuit 50C are provided, instead of the weighting factor calculation circuit 50.

A weighting factor calculation circuit 50A calculates the weighting factors so that the weighting factor for the peripheral pixel with middle distance may be larger, emphasizing the peripheral pixel in which the distance on color space is middle distance. A weighting factor calculation circuit 50B calculates the weighting factors so that the weighting factor for the peripheral pixel with near distance may be larger, emphasizing the peripheral pixel in which the distance on color space is near distance.

Figure 14B:
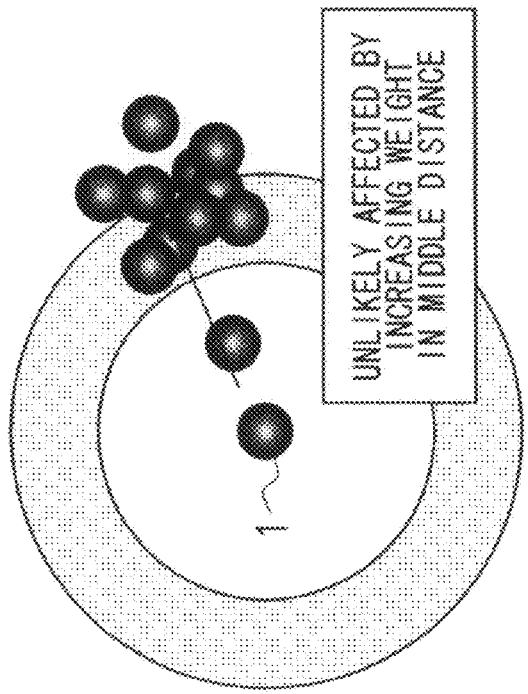
FIGS. 14A and 14B are views for explaining a difference in the noise reduction effect between the pixels in the near distance and the middle distance on the color space to be emphasized.
Figure 14A:
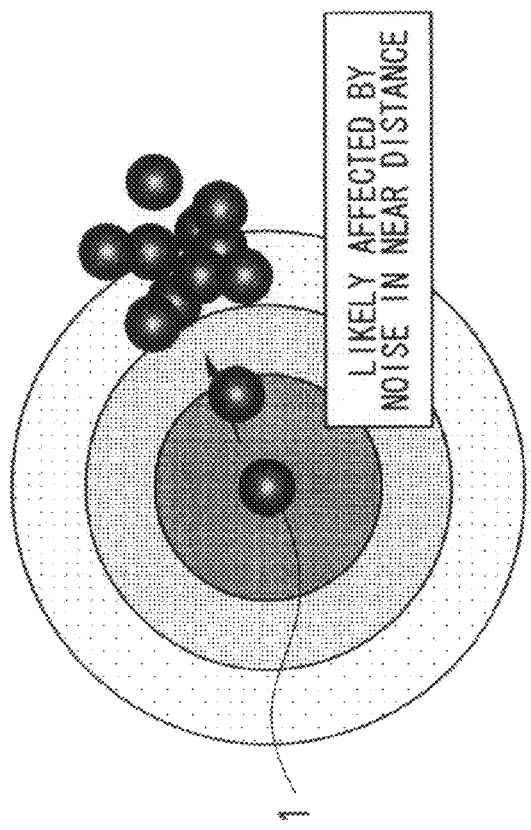

The uniformly distributed noise can be reduced by increasing the weight of pixel values of the peripheral pixels (including the noticed pixel 1) in which the distance on color space is near distance, but the noise with strong impulse has the small noise reduction effect through the same process because it is likely affected by the pixel value of its own (noticed pixel 1) (FIG. 14A).

Thus, the noticed pixel 1 can be unlikely affected by the noise with strong impulse by increasing the weighting factor for the peripheral pixel in which the distance on the color space is middle distance, whereby the noise reduction effect can be increased, as shown in FIG. 14B.

A factor selection circuit 50C switches between the weighting factor calculation circuits 50A and 50B, depending on the photographing condition (ISO sensitivity and white balance correction value) and the processing conditions (edge enhancement, other noise reduction process and so on), in which the weighting factor calculated by any one of the weighting factor calculation circuits is outputted to the weighted average processing circuit 60.

Figure 16:
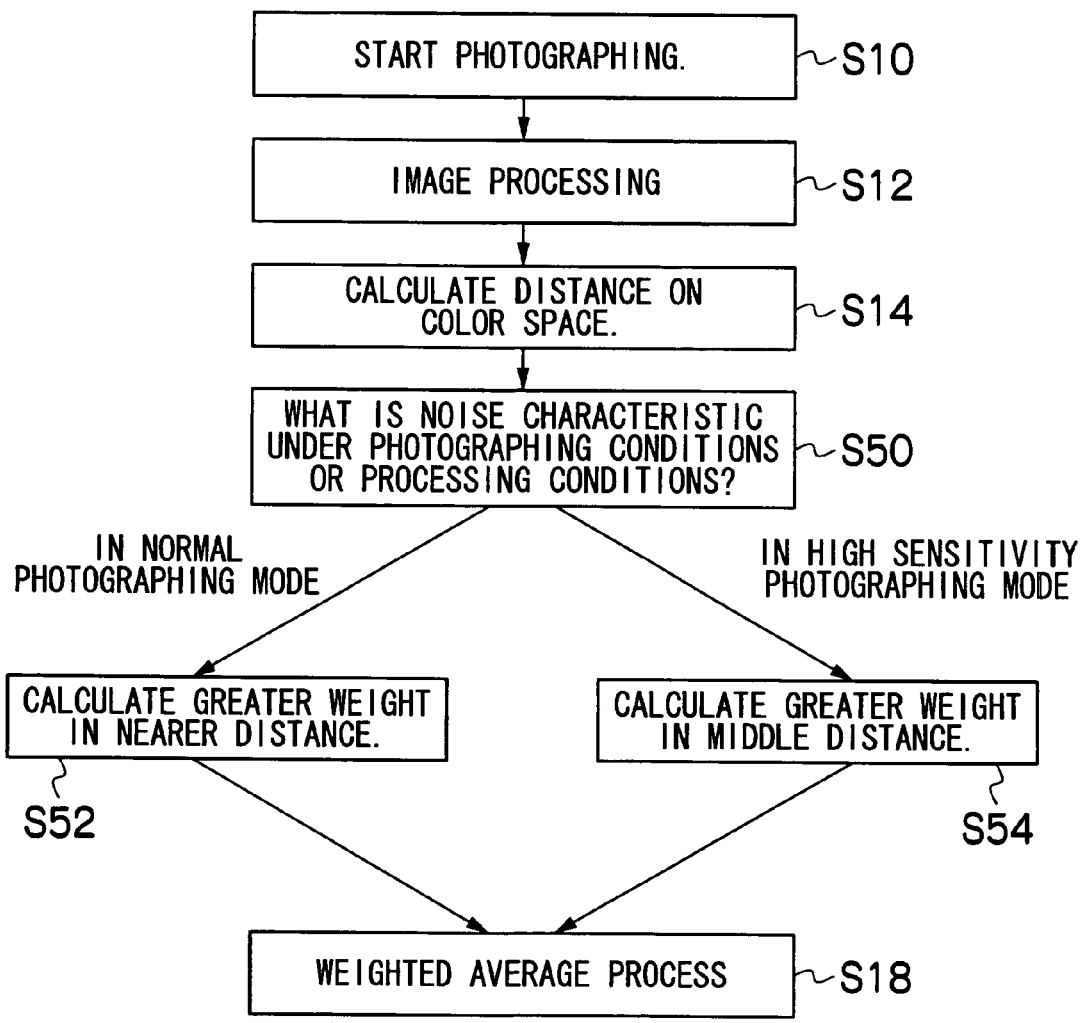
FIG. 16 is a flowchart showing an operation procedure of the image pickup apparatus having the image processing device according to the fifth embodiment.

FIG. 16 is a flowchart showing an operation procedure of the image pickup apparatus having the image processing device according to the fifth embodiment. The common processing steps to the flowchart as shown in FIG. 5 are designated by the same step numbers, and not described in detail here.

The distance on the color space between the noticed pixel and each of its peripheral pixels is calculated at step S14, as shown in FIG. 16. Then, the normal photographing or the high sensitivity photographing is discriminated in accordance with the photographing conditions and the processing conditions (step S50). And during the normal photographing, the weighting factor is calculated such that the peripheral pixel in nearer distance has the stronger weighting factor (step S52), whereas during the high sensitivity photographing, the weighting factor is calculated such that the peripheral pixel in middle distance has the strong weighting factor (step S54).

At step S18, a weighted average of the pixel values of the peripheral pixels is obtained, using the weighting factors calculated at step S52 or S54, in which its processing result is made the pixel value of the noticed pixel.

Sixth Embodiment

Figure 17:
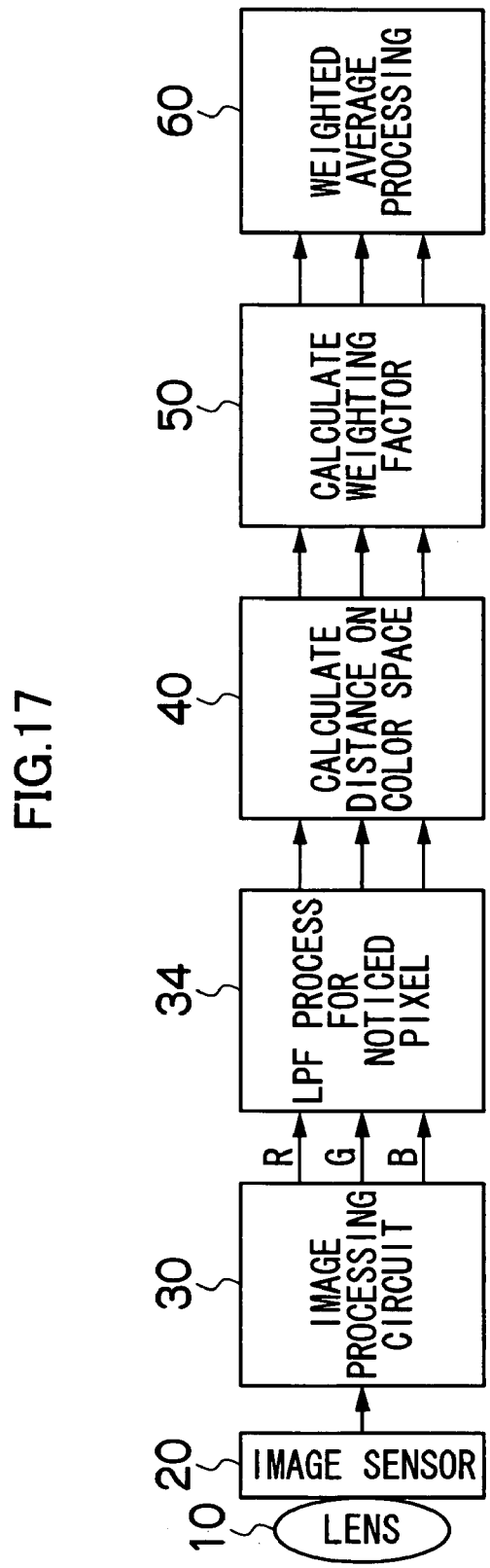
FIG. 17 is an essential block diagram of an image pickup apparatus having an image processing device according to a sixth embodiment of the invention.

FIG. 17 is an essential block diagram of an image pickup apparatus having an image processing device according to a sixth embodiment of the invention. The common parts to the first embodiment as shown in FIG. 2 are designated by the same signs, and not described in detail here.

Figure 18A:
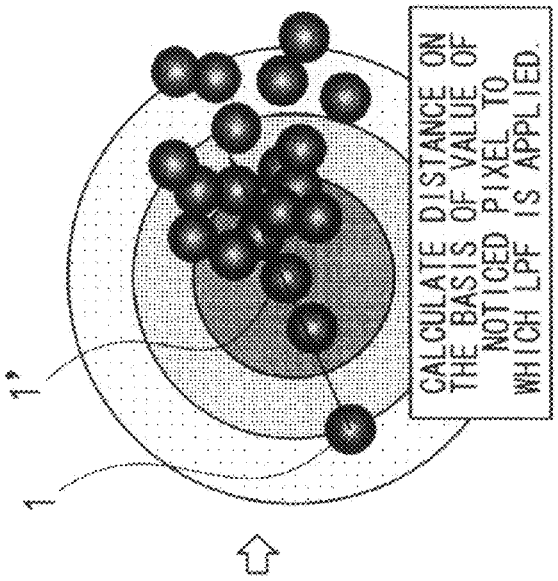
FIGS. 18A to 18C are views for explaining the change in the distance on the color space between the noticed pixel and the peripheral pixels after an LPF is applied to the noticed pixel.

If the noise level is greater, a dispersion in the pixels within the processing range is increased. When the noticed pixel 1 is located at an end of the dispersion as shown in FIG. 18A, the distance from the center of dispersion is so large that the noise reduction effect is decreased.

Figure 18B:
Figure 18C:
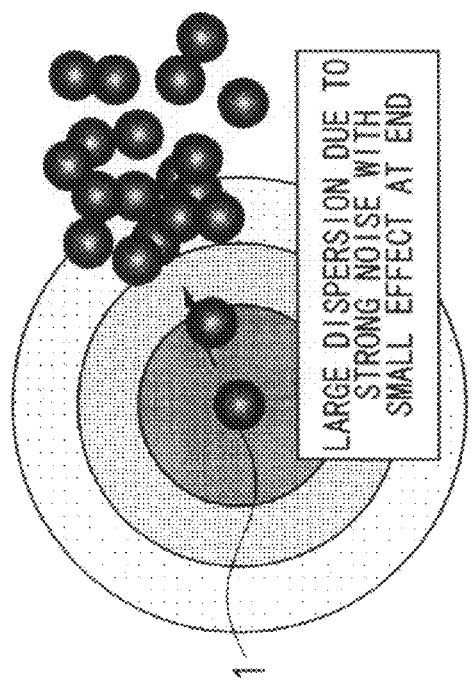

Thus, a low pass filter (LPF) is applied to the noticed pixel 1 using the peripheral pixels, as shown in FIG. 18B. The distance on the color space is calculated on the basis of the value of the filtered noticed pixel 1' (FIG. 18C).

Thereby, it is possible to suppress a decrease in the noise reduction effect due to the strong noise.

The image pickup apparatus of the sixth embodiment as shown in FIG. 17 is different from the image pickup apparatus of the first embodiment as shown in FIG. 2 in that an LPF processing circuit 34 is additionally provided between the image processing circuit 30 and the distance calculation circuit 40.

The LPF processing circuit 34 has an LPF of the filter coefficients (4/8 for the noticed pixel and 1/8 for the upper, lower, left and right four pixels), as shown in FIG. 18B, for example. For this noticed pixel 1, the LPF is applied to the pixel values of the peripheral pixels including the noticed pixel.

The distance calculation circuit 40 calculates the distance on the color space for each peripheral pixel between the pixel value of the noticed pixel 1' to which the LPF is applied and each of the pixel values of its peripheral pixels.

The pixel value of the noticed pixel when the weighted average processing circuit 60 performs the weighted average process is the original pixel value before applying the LPF.

FIG. 19 is a flowchart showing an operation procedure of the image pickup apparatus having the image processing device according to the sixth embodiment. The common processing steps to the flowchart as shown in FIG. 5 are designated by the same step numbers, and not described in detail here.

The LPF process is applied to the noticed pixel before calculating the distance on the color space (step S60), as shown in FIG. 19. The distance on the color space between the noticed pixel to which the LPF process is applied and each of its peripheral pixels is calculated (step S14). If the distance is nearer, the weighting factor is made greater (step S62), while if the distance is farther, the weighting factor is made smaller (step S64).

Thereafter, a weighted average of the pixel values of the peripheral pixels including the noticed pixel is obtained, using the calculated weighting factors, in which its processing result is made the pixel value of the noticed pixel, although the pixel value of the noticed pixel for use in the weighted average process is the original pixel value before the LPF process (step S18).

Seventh Embodiment

Figure 20:
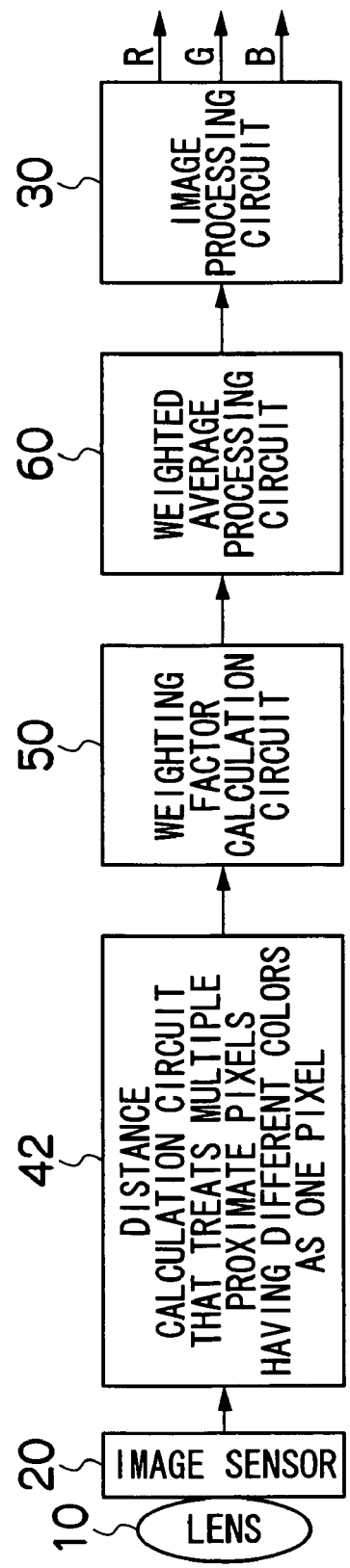
FIG. 20 is an essential block diagram of an image pickup apparatus having an image processing device according to a seventh embodiment of the invention.

FIG. 20 is an essential block diagram of an image pickup apparatus having an image processing device according to a seventh embodiment of the invention. The common parts to the first embodiment as shown in FIG. 2 are designated by the same signs, and not described in detail here.

The image pickup apparatus of the seventh embodiment as shown in FIG. 20 is different from the first embodiment in that the noise reduction process is performed for unsynchronized output data of the image sensor 20 at the former stage of the image processing circuit 30, although in the first embodiment the noise reduction process is performed for synchronized image data of RGB.

The data of each pixel before synchronization taken out of the image sensor 20 is any color data of RGB corresponding to the color filter array of the image sensor 20.

Figures 21A, 21B:
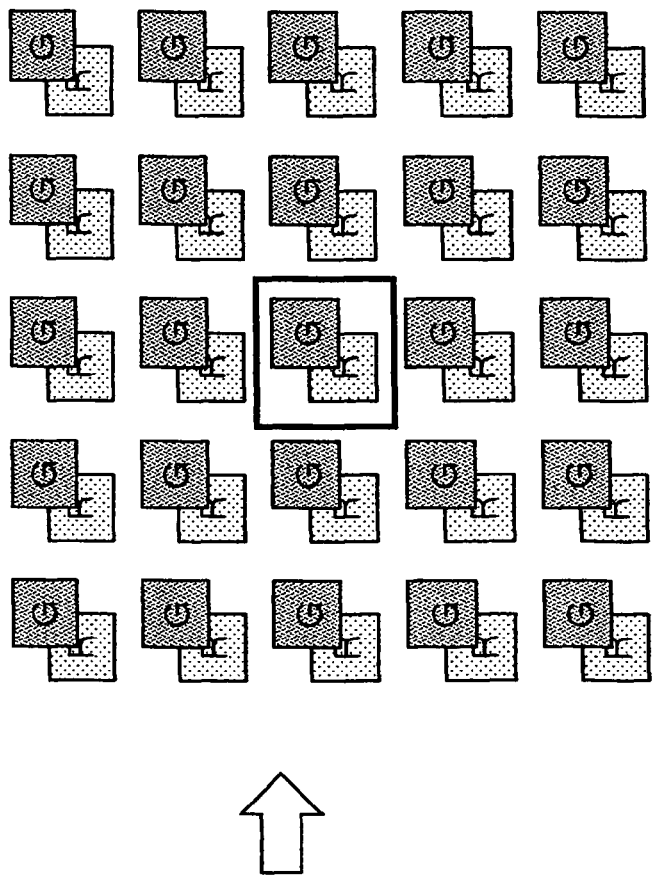
FIGS. 21A and 21B are views for explaining a method for acquiring the multi-channel pixels from image data before the synchronization process.

Now, when the color filter of the image sensor 20 is a vair array, color data of RGB as shown in FIG. 21A is obtained from the image sensor 20.

The distance calculation circuit 42 that inputs the color data of RGB from the image sensor 20 treats multiple proximate pixels having different colors as the noticed pixel at the same pixel position and the peripheral pixels including the noticed pixel to make multi-channel.

That is, in processing the R pixel surrounded by the rectangle in FIG. 21A, this distance calculation circuit 42 pairs the R pixel with the adjacent G pixel to make multi-channel and treats them as the same position pixel. FIG. 21B shows the pixels in the processing range of 5×5 pixels, regarding two adjacent pixels having different colors as one pixel in this manner.

The distance calculation circuit 42 can calculate the distance on the color space (color space of two channels in this case) even for the image data before synchronization, using the multiple proximate pixels having different colors as the noticed pixel at the same pixel position and the peripheral pixels.

In processing the B pixels, the B pixels are paired with adjacent G pixels to make multi-channel. Also, in processing the G pixels in the odd line in FIG. 21A, the G pixels are paired with the adjacent R pixels to make multi-channel, while in processing the G pixels in the even line, the G pixels are paired with the adjacent B pixels to make multi-channel.

Though the image sensor having the color filter of the vair array has been described above in this embodiment, other filter arrays may be similarly handled.

Figure 22:
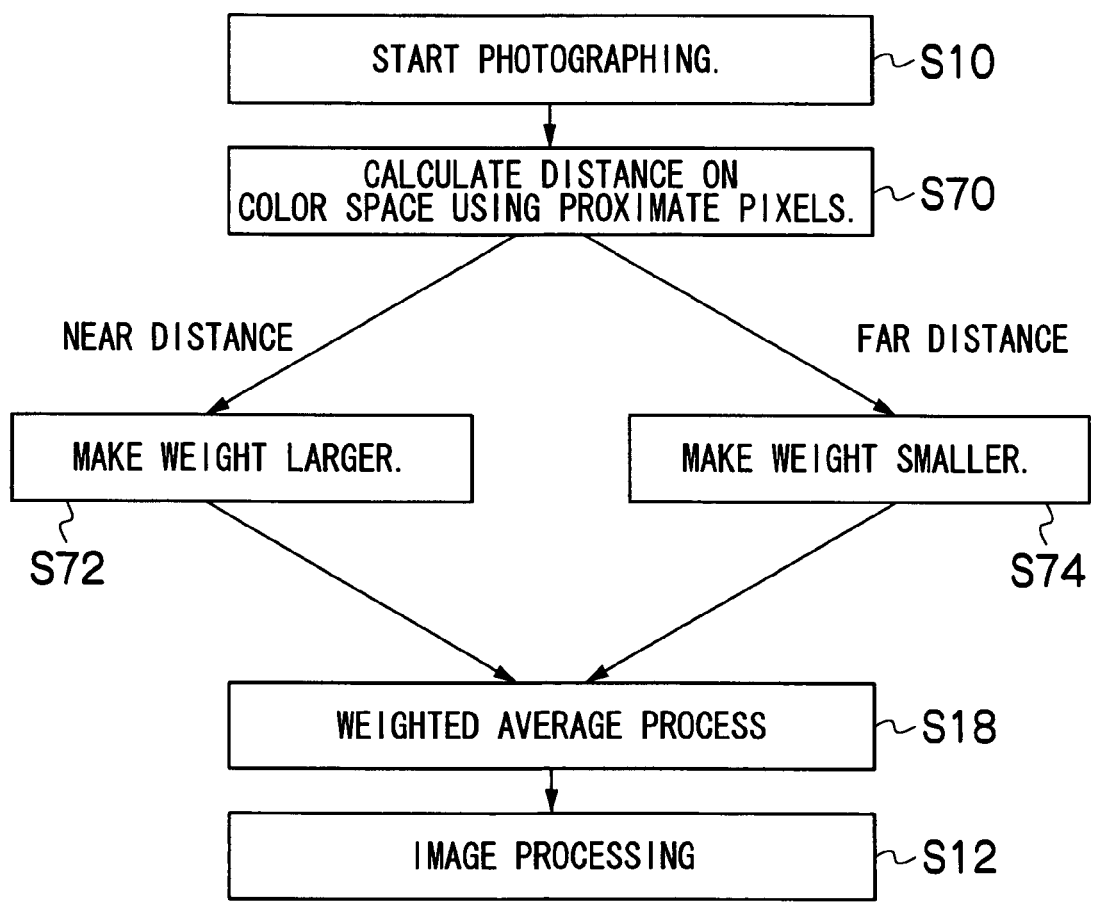
FIG. 22 is a flowchart showing an operation procedure of the image pickup apparatus having the image processing device according to the seventh embodiment.

FIG. 22 is a flowchart showing an operation procedure of the image pickup apparatus having the image processing device according to the seventh embodiment. The common processing steps to the flowchart as shown in FIG. 5 are designated by the same step numbers, and not described in detail here.

As shown in FIG. 22, the image data of RGB before synchronization obtained from the image sensor 20 is taken in at the time of photographing, and the distance on the color space for two channels between the noticed pixel and the peripheral pixel, using two proximate pixels having different colors as the noticed pixel at the same pixel position and the peripheral pixel (step S70).

If the calculated distance is nearer, the weighting factor is made greater (step S72), while if the distance is farther, the weighting factor is made smaller (step S74).

Then, a weighted average of the pixel values of the peripheral pixels including the noticed pixel is obtained, using the calculated weighting factors, in which its processing result is made the pixel value of the noticed pixel (step S18). Thereafter, various image processes are performed for the image data subjected to the noise reduction process in the above manner (step S12).

Eighth Embodiment

Figure 23:
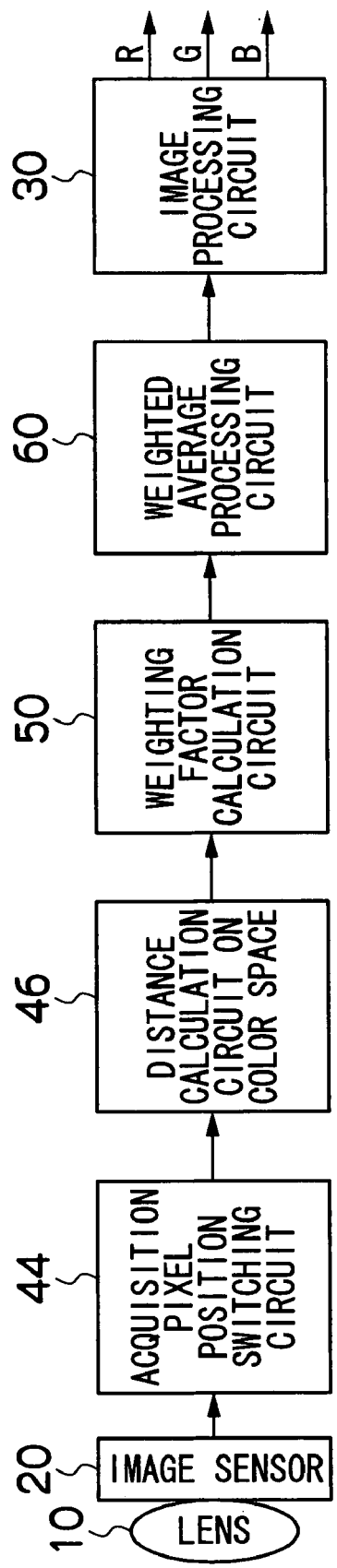
FIG. 23 is an essential block diagram of an image pickup apparatus having an image processing device according to an eighth embodiment of the invention.

FIG. 23 is an essential block diagram of an image pickup apparatus having an image processing device according to an eighth embodiment of the invention. The common parts to the seventh embodiment as shown in FIG. 20 are designated by the same signs, and not described in detail here.

The image pickup apparatus of the eighth embodiment as shown in FIG. 23 is different from the image pickup apparatus of the seventh embodiment in that an acquisition pixel switching circuit 44 and a distance calculation circuit 46 are provided, instead of the distance calculation circuit 42 of the seventh embodiment, and more particularly, the processing circuit at the latter stage can be used commonly for a plurality of image sensors having different color filter array.

That is, the acquisition pixel switching circuit 44 switches the acquisition positions of multiple proximate pixels having different colors, which are acquired from the image sensor to make multi-channel, in accordance with the color filter array of the image sensor, in which multiple pixels of the same color set are acquired, regardless of the color filter array of the image sensor.

Figure 24C:
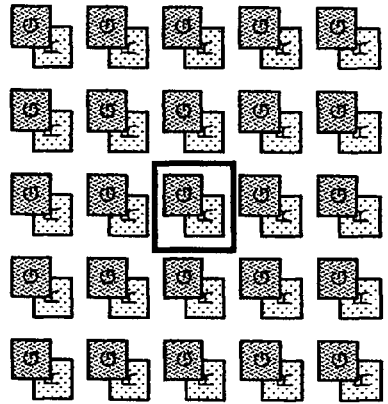
FIGS. 24A to 24C are views for explaining a method for acquiring the multi-channel pixels from image data before the synchronization process with different color filters.
Figure 24A:
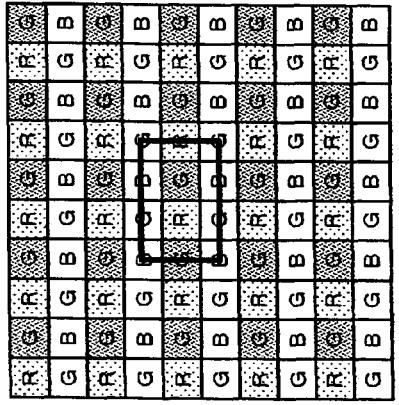

For example, when the noise reduction process is performed for the R pixels (R pixel surrounded by the rectangle) of the image sensor 20 having the color filter of the vair array, as shown in FIG. 24A, the R pixels are paired with adjacent G pixels to make multi-channel, and they are outputted as the pixel at the same position to the distance calculation circuit 46 at the latter stage.

FIG. 24C shows the pixels in the processing range of 5×5 pixels, regarding adjacent two pixels having different colors as one pixel in this manner, like FIG. 21B.

Figure 24B:
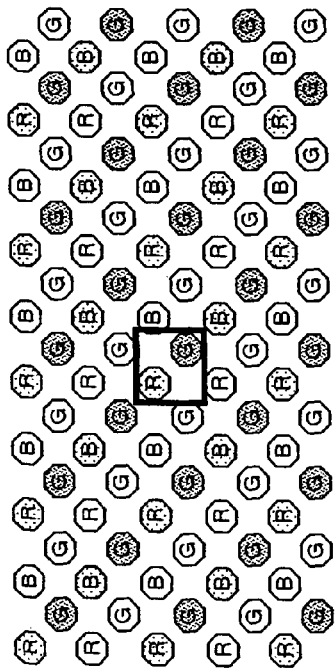

On the other hand, FIG. 24B shows a light receiving surface of the image sensor with the pixel array called a honeycomb array. This honeycomb array is such that the pixels having the octagonal light receiving surface are arranged at a regular period of array in a horizontal direction (row direction) and a vertical direction (column direction), with every other geometrical center points of the pixels being shifted by half (½ pitch) of the pixel pitch in the row direction and the column direction, in which the primary color filter of RGB is arranged corresponding to each pixel. That is, the pixels are arranged such that the row of GGGG . . . appears at the next stage to the row of RBRB . . . , and the row of BRBR . . . appears at the next stage in the horizontal direction, whereby at the reading time, the pixels are read in the order of RGB-GRGBR . . . from two adjacent rows.

And when the noise reduction process is performed for the R pixels (R pixel surrounded by the square) of the image sensor 20 having the color filter of the honeycomb array, the acquisition pixel switching circuit 44 acquires the pixels so that the R pixels are paired with the adjacent G pixels to make multi-channel, and outputs them as the pixel at the same position to the distance calculation circuit 46 at the latter stage.

The distance calculation circuit 46 can calculate the distance on the color space even for the image data before synchronization, using multiple proximate pixels having different colors outputted from the acquisition pixel switching circuit 44 as the noticed pixel at the same pixel position and the peripheral pixels.

In this embodiment, when the image sensor has the vair array or the honeycomb array, the same pair of pixels can be acquired. The color filter array or the combination of pixels handled as the same pixel position is not limited to this embodiment.

Figure 25:
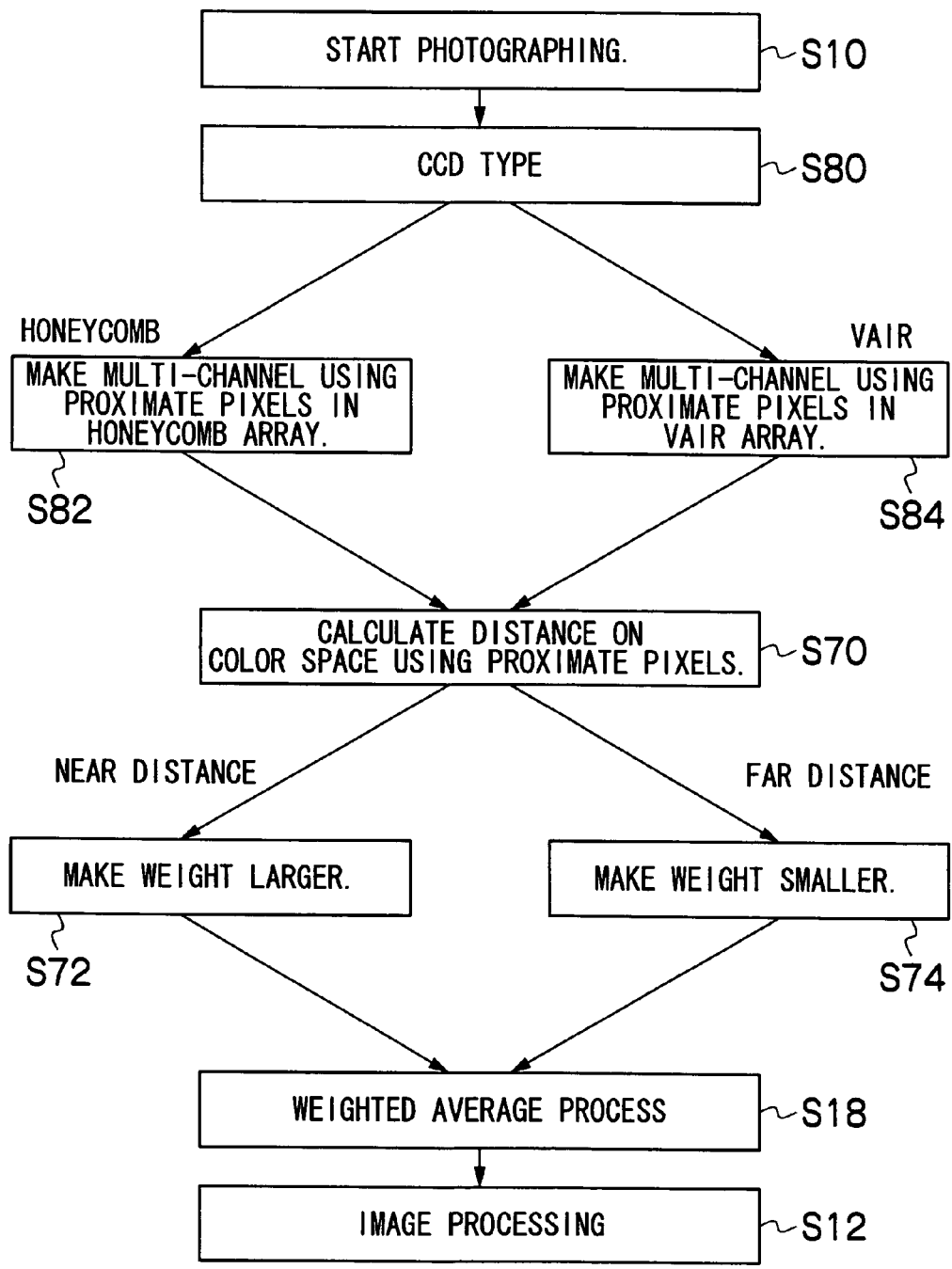
FIG. 25 is a flowchart showing an operation procedure of the image pickup apparatus having the image processing device according to the eighth embodiment.

FIG. 25 is a flowchart showing an operation procedure of the image pickup apparatus having the image processing device according to the eighth embodiment. The common processing steps to the flowchart as shown in FIG. 22 are designated by the same step numbers, and not described in detail here.

The pixels are taken in by switching the acquisition positions of multiple proximate pixels having different colors in accordance with the CCD type of the image sensor 20 for use in the image pickup apparatus to make multi-channel (step S80), as shown in FIG. 25. That is, when the CCD type is the honeycomb array, the multi-channel is made, using the proximate pixels (e.g., pair of R pixel and G pixel, or pair of B pixel and G pixel) in the honeycomb array (step S82). When the CCD type is the vair array, the multi-channel is made, using the proximate pixels in the vair array (the same pair of pixels as the honeycomb array) (step S84).

The distance on the color space for two channels between the noticed pixel and the peripheral pixel is calculated, using two proximate pixels having different colors in multi-channel in the above manner as the noticed pixel at the same pixel position and the peripheral pixel (step S70).

Ninth Embodiment

Figure 26:
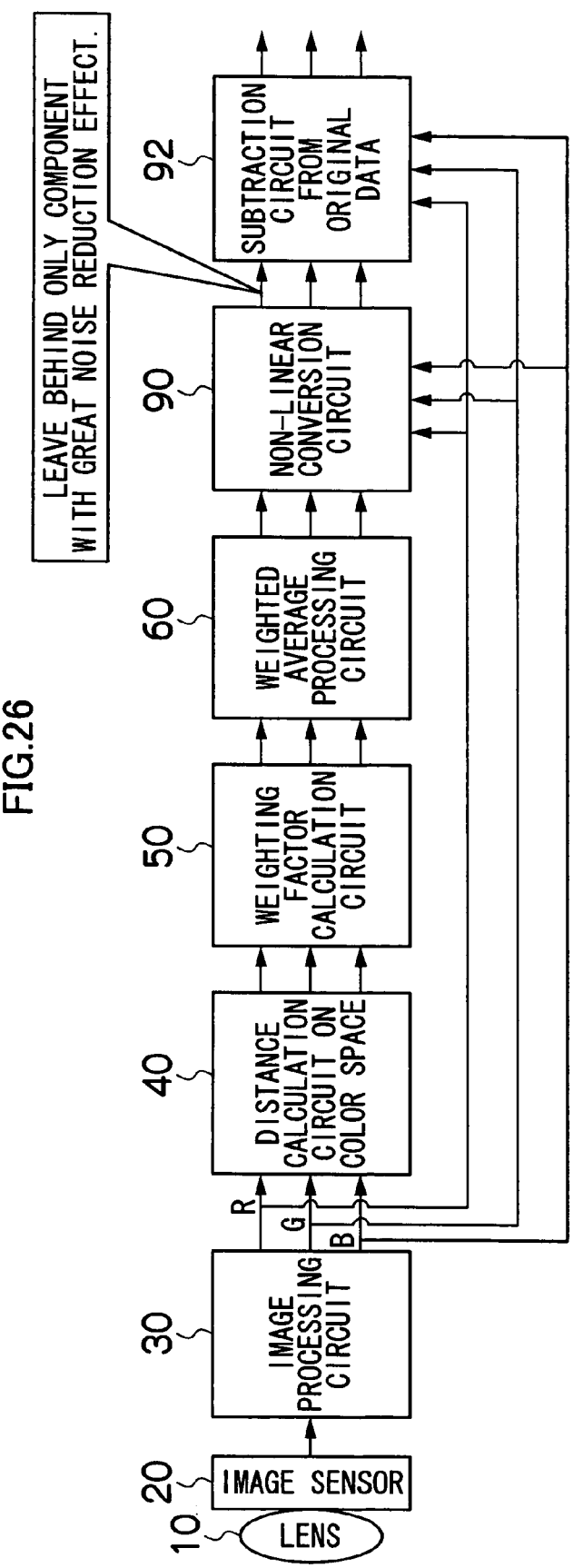
FIG. 26 is an essential block diagram of an image pickup apparatus having an image processing device according to a ninth embodiment of the invention.

FIG. 26 is an essential block diagram of an image pickup apparatus having an image processing device according to a ninth embodiment of the invention. The common parts to the first embodiment as shown in FIG. 1 are designated by the same signs, and not described in detail here.

The image pickup apparatus of the ninth embodiment as shown in FIG. 26 is different from the image pickup apparatus of the first embodiment as shown in FIG. 2 in that a non-linear conversion circuit 90 and a subtraction circuit 92 are additionally provided at the latter stage of the weighted average processing circuit 60.

The weighted average process is performed for image data by the weighted average processing circuit 60, and the image data is applied to the non-linear conversion circuit 90. The image data (original image data) not subjected to the noise reduction process is applied from the image processing circuit 30 to the other input of the non-linear conversion circuit 90, and the non-linear conversion circuit 90 subtracts the image data after the noise reduction process from the original image data. This subtraction value (difference value) indicates the noise component contained in the original image data.

Figure 27:
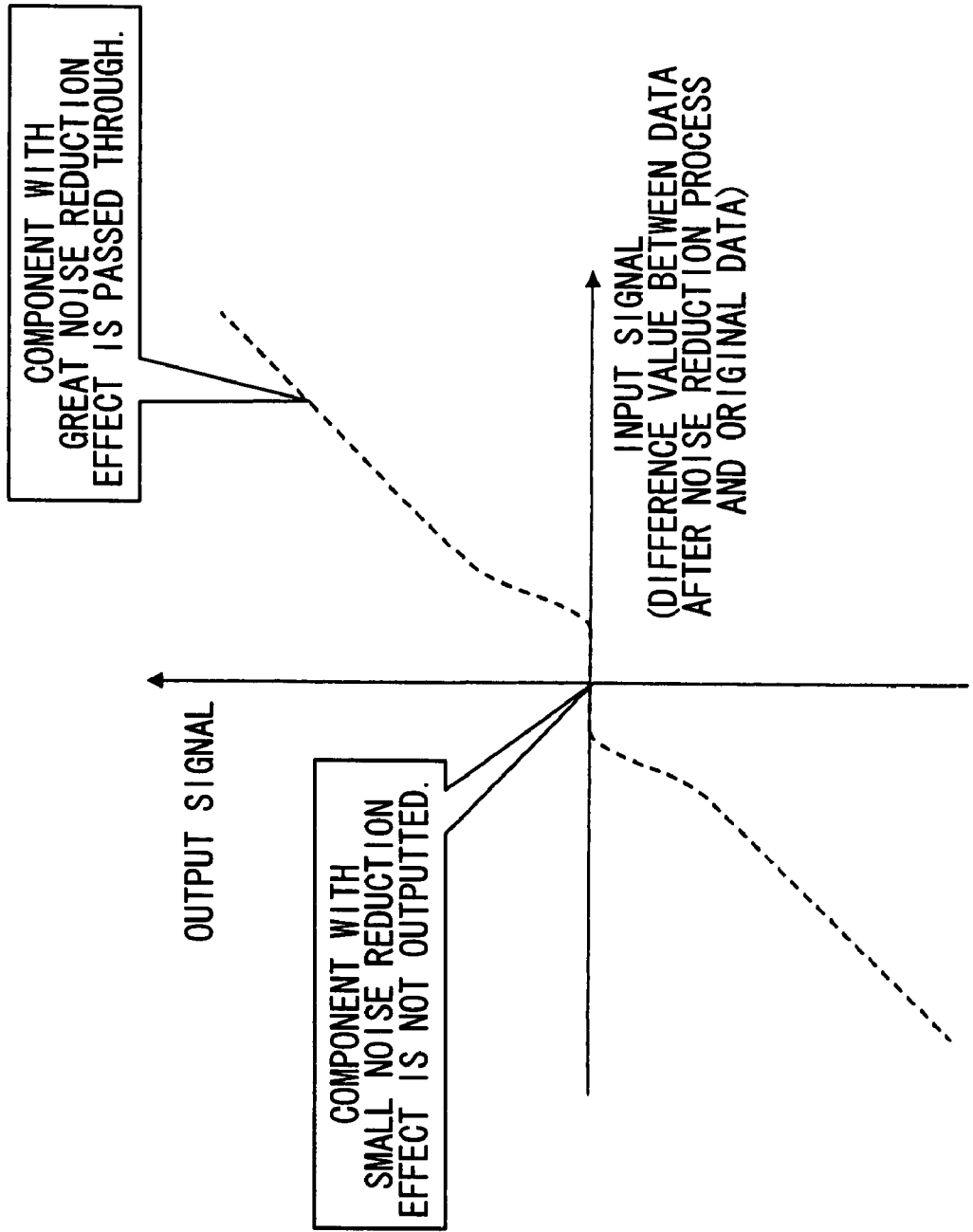
FIG. 27 is a view for explaining a non-linear conversion circuit as shown in FIG. 26.

The non-linear conversion circuit 90 performs the non-linear conversion of not outputting a part (detail of image) of small difference values (noise component) and outputting a part of large difference values (strong noise), and outputs this to the subtraction circuit 92, as shown in FIG. 27.

The original image data is applied from the image processing circuit 30 to the other input of the subtraction circuit 92, and the subtraction circuit 92 subtracts the noise component after non-linear conversion from the original image data. Thereby, it is possible to reduce only the visually strong noise component while leaving the detail of the original image data.

Figure 28:
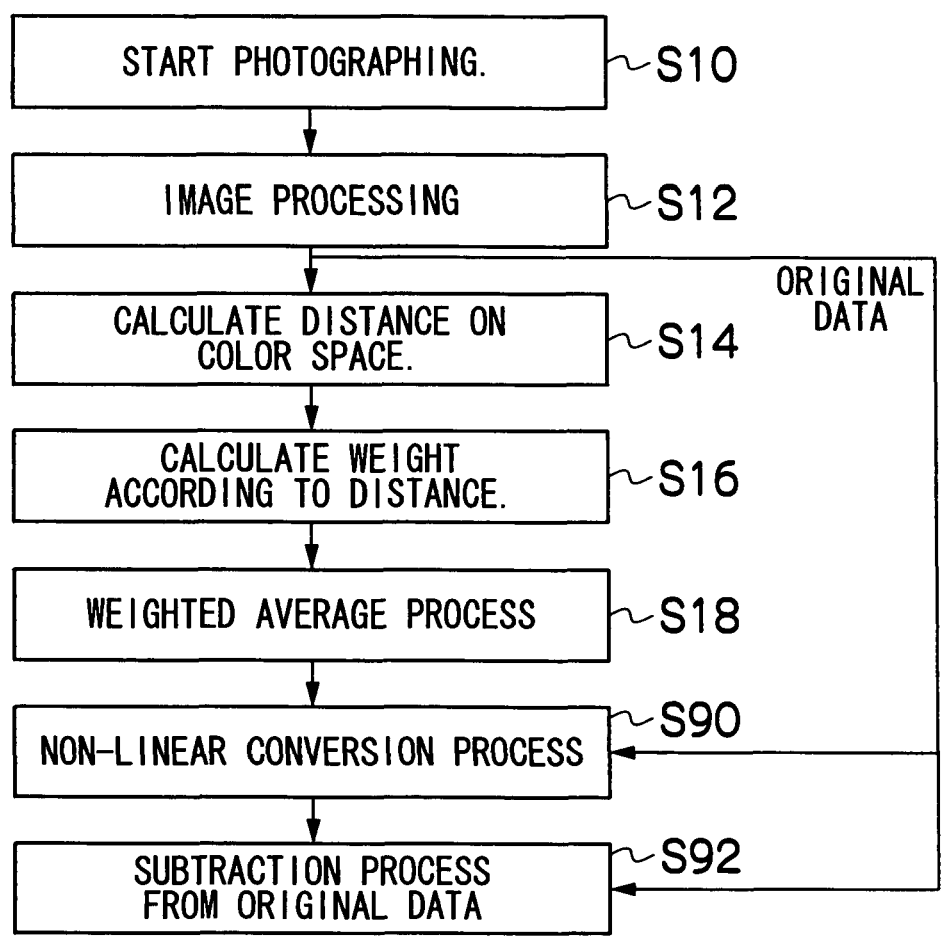
FIG. 28 is a flowchart showing an operation procedure of the image pickup apparatus having the image processing device according to the ninth embodiment.

FIG. 28 is a flowchart showing an operation procedure of the image pickup apparatus having the image processing device according to the ninth embodiment. The common processing steps to the flowchart as shown in FIG. 5 are designated by the same step numbers, and not described in detail here.

The steps S90 and S92 are newly added to the latter stage of step S18, as shown in FIG. 28.

At step S90, the non-linear conversion process for a difference value is performed by taking the difference value (noise component) between original image data and image data after the weighted average process. This non-linear conversion process involves not outputting a part of the noise component having small value, and outputting a part of the large difference value (strong noise), as shown in FIG. 27.

At step S92, the noise component after non-linear conversion is subtracted from the original image data, whereby only the visually strong noise component is reduced while the detail of original image data is left behind.

While the image processing device of the invention used for the image pickup apparatus has been described above, the invention is not limited thereto, but may be embodied in any form in which the noise reduction process for image data is performed by inputting the color image data. For example, the invention is applicable to such a case where RAW data is taken out of the recording medium recording the RAW data and processed. Also, in this embodiment, the image processing device of the invention is embodied by hardware.

What is claimed is:

1. An image processing device, comprising:
   an image input device for inputting image data representing a color image;
   a distance calculation device for calculating a distance on a color space between a noticed pixel of the inputted color image and each of peripheral pixels including the noticed pixel;

a factor calculation device for calculating a weighting factor for each peripheral pixel in accordance with the calculated distances;

a weighted average processing device for calculating image data of the noticed pixel by obtaining a weighted average of image data of the peripheral pixels using the weighing factor calculated for each peripheral pixel; and a filtering processing device for performing a filtering process for the noticed pixel of the inputted color image, wherein the distance calculation device calculates the distance on the color space between the noticed pixel of the inputted color image that is passed through the filtering process, and each of the peripheral pixels including the noticed pixel that is not passed through the filtering process.

2. The image processing device according to claim 1, further comprising a processing range selection device for selecting any processing range from among a plurality of processing ranges, wherein the peripheral pixels including the noticed pixel are pixels within the selected processing range around the noticed pixel.

3. The image processing device according to claim 2, wherein the processing range selection device selects a large processing range in processing a color image photographed at high sensitivity.

4. The image processing device according to claim 3, wherein the processing range selection device selects a small processing range in increasing the processing speed, or saving a power consumption.

5. The image processing device according to claim 4, wherein the factor calculation device calculates the weighting factors for the peripheral pixels for every color channel of the peripheral pixels.

6. The image processing device according to claim 5, wherein the factor calculation device calculates the weighting factors for the peripheral pixels, the weighting factors being different depending on a noise characteristic of the inputted color image.

7. The image processing device according to claim 2, wherein the processing range selection device selects a small processing range in increasing the processing speed, or saving a power consumption.

8. The image processing device according to claim 1, wherein the factor calculation device calculates the weighting factors for the peripheral pixels for every color channel of the peripheral pixels.

9. The image processing device according to claim 1, wherein the factor calculation device calculates the weighting factors for the peripheral pixels, the weighting factors being different depending on a noise characteristic of the inputted color image.

10. The image processing device according to claim 1, wherein the image input device inputs image data representing the color image unsynchronized corresponding to an array of a color filter from an image pickup element of a single plane type where the color filter of three primary colors is arranged, and wherein the distance calculation device calculates the distance on the color space between the noticed pixel comprising a plurality of pixels and each of the peripheral pixels including the noticed pixel, using a plurality of proximate pixels having different colors as the noticed pixel at a same pixel position of the plurality of proximate pixels, and the peripheral pixels including the noticed pixel.

11. The image processing device according to claim 10, further comprising a pixel position switching device for inputting image data representing the unsynchronized color image, capturing the plurality of proximate pixels having different colors at the same pixel position, and switching pixel positions to capture a plurality of pixels in accordance with a pattern of the color filter for the image pickup element of single plane type to make a same organization of color pixels within the plurality of pixels, regardless of the pattern of the color filter.

12. The image processing device according to claim 11, further comprising:

a noise component acquisition device for acquiring, as a noise component, a difference between image data representing the color image before image processing that is inputted by the image input device and image data representing the color image after image processing that is calculated by the weighted average processing device;

a nonlinear conversion device for making a nonlinear conversion of the acquired noise component; and a subtraction device for subtracting the noise component subjected to the nonlinear conversion from the image data representing the color image before image processing.

13. The image processing device according to claim 12, wherein the nonlinear conversion device eliminates only the noise component at small level from the noise component.

14. The image processing device according to claim 1, wherein the factor calculation device calculates the weighting factor for said each peripheral pixel in accordance with the distance on the color space calculated for said each peripheral pixel.

15. The image processing device according to claim 1, wherein the weighting factor for said each peripheral pixel is calculated in accordance with the distance on the color space.

16. The image processing device according to claim 1, wherein the noticed pixel is configured from a plurality of pixels having different colors.

17. The image processing device according to claim 1, wherein the factor calculation device calculates the weighting factors for the peripheral pixels for every color difference data of the peripheral pixels.

18. An image processing device, comprising:

an image input device for inputting image data representing a color image;

a distance calculation device for calculating a distance on a color space between a noticed pixel of the inputted color image and each of peripheral pixels including the noticed pixel;

a factor calculation device for calculating a weighting factor for each peripheral pixel in accordance with the calculated distance; and a weighted average processing device for calculating image data of the noticed pixel by obtaining a weighted average of image data of the peripheral pixels using the weighting factor calculated for each peripheral pixel, wherein the image input device inputs image data representing the color image unsynchronized corresponding to an array of a color filter from an image pickup element of a single plane type where the color filter of three primary colors is arranged, and wherein the distance calculation device calculates the distance on the color space between the noticed pixel comprising a plurality of pixels and each of the peripheral pixels including the noticed pixel, using a plurality of proximate pixels having different colors as the noticed pixel at a same pixel position of the plurality of proximate pixels, and the peripheral pixels including the noticed pixel.

19. The image processing device according to claim 18, further comprising a pixel position switching device for inputting image data representing the unsynchronized color image, capturing the plurality of proximate pixels having different colors at the same pixel position, and switching pixel positions to capture a plurality of pixels in accordance with a pattern of the color filter for the image pickup element of single plane type to make a same organization of color pixels within the plurality of pixels, regardless of the pattern of the color filter.

20. An image processing device, comprising;
an image input device for inputting image data representing a color image:
a distance calculation device for calculating a distance on a color space between a noticed pixel of the inputted color image and each of peripheral pixels including the noticed pixel;
a factor calculation device for calculating a weighting factor for each peripheral pixel in accordance with the calculated distance;
a weighted average processing device for calculating image data of the noticed pixel by obtaining a weighted average of image data of the peripheral pixels using the weighting factor calculated for each peripheral pixel;
a noise component acquisition device for acquiring, as a noise component, a difference between image data representing the color image before image processing that is inputted by the image input device and image data representing the color image after image processing that is calculated by the weighted average processing device;
a nonlinear conversion device for making a nonlinear conversion of the acquired noise component; and
a subtraction device for subtracting the noise component subjected to the nonlinear conversion from the image data representing the color image before image processing.

21. The image processing device according to claim 20, wherein the nonlinear conversion device eliminates only the noise component at small level from the noise component.

22. An image processing method comprising:
inputting image data representing a color image;
calculating a distance on a color space between a noticed pixel of the inputted color image and each of peripheral pixels including the noticed pixel, as executed by a processing unit on a computer;
calculating a weighting factor for each peripheral pixel in accordance with the calculated distance; and
calculating image data of the noticed pixel by obtaining a weighted average of image data of the peripheral pixels using factor calculated for each peripheral pixel,
wherein the inputting the image data comprises inputting image data representing a color image unsynchronized corresponding to an array of a color filter from an image pickup element of a single plane type where the color filter of three primary colors is arranged, and
wherein the calculating the distance comprises calculating the distance on the color space between the noticed pixel comprising a plurality of pixels and each of the peripheral pixels including the noticed pixel, using a plurality of proximate pixels having different colors as the noticed pixel at a same pixel position of the plurality of proximate pixels, and the peripheral pixels including the noticed pixel.

23. The image processing method according to claim 22, further comprising selecting any processing range from among a plurality of processing ranges, in which the peripheral pixels including the noticed pixel in calculating the distance on the color space are pixels within the selected processing range around the noticed pixel.

24. The image processing method according to claim 23, wherein the selecting the processing range comprises selecting a large processing range in processing the color image photographed at high sensitivity.

25. The image processing method according to claim 24, wherein the selecting the processing range comprises selecting a small processing range in increasing the processing speed, or saving the power consumption.

26. The image processing method according to claim 25, wherein the calculating the weighting factor comprises calculating the weighting factors for the peripheral pixels for each color channel of the peripheral pixels.

27. The image processing method according to claim 26, wherein the calculating the weighting factor comprises reducing the weighting factor for the peripheral pixel in which the calculated distance is near distance, if a noise of the color image is large depending on the noise characteristic of the inputted color image.

28. The image processing method according to claim 27, further comprising making a filtering process for the noticed pixel of the inputted color image,
wherein the calculating the distance comprises calculating the distance on the color space between a noticed pixel that is subjected to the filtering process and each of the peripheral pixels including a noticed pixel that is not subjected to the filtering process.

29. The image processing method according to claim 28, further comprising inputting image data representing the unsynchronized color image, capturing the plurality of proximate pixels having different colors at the same pixel position, and switching pixel positions to capture a plurality of pixels in accordance with a pattern of the color filter for the image pickup element of single plane type to make the same organization of color pixels within the plurality of pixels, regardless of the pattern of the color filter.

30. The image processing method according to claim 29, further comprising:
acquiring, as a noise component, a difference between image data representing the color image before image processing that is inputted by the image input device and image data representing the color image after image processing that is calculated by the weighted average processing device;
making a nonlinear conversion of the acquired noise component; and
subtracting the noise component subjected to the nonlinear conversion from the image data representing the color image before image processing.

31. The image processing method according to claim 30, wherein the nonlinear conversion comprises eliminating only the noise component at small level from the noise component.

32. The image processing method according to claim 23, wherein the selecting the processing range comprises selecting a small processing range in increasing the processing speed, or saving the power consumption.

33. The image processing method according to claim 22, wherein the calculating the weighting factor comprises calculating the weighting factors for the peripheral pixels for each color channel of the peripheral pixels.

34. The image processing method according to claim 22, wherein the calculating the weighting factor comprises reducing the weighting factor for the peripheral pixel in which the calculated distance is near distance, if a noise of the color image is large depending on the noise characteristic of the inputted color image.

35. The image processing method according to claim 22, further comprising making a filtering process for the noticed pixel of the inputted color image,
  wherein the calculating the distance comprises calculating the distance on the color space between a noticed pixel that is subjected to the filtering process, and each of the peripheral pixels including a noticed pixel that is not subjected to the filtering process.

36. The image processing method according to claim 22, further comprising inputting image data representing the unsynchronized color image, capturing the plurality of proximate pixels having different colors at the same pixel position, and switching pixel positions to capture a plurality of pixels in accordance with a pattern of the color filter for the image pickup element of single plane type to make the same organization of color pixels within the plurality of pixels, regardless of the pattern of the color filter.

37. The image processing method according to claim 22, wherein the weighting factor for said each peripheral pixel is calculated in accordance with the distance on the color space calculated for said each peripheral pixel.

38. The image processing method according to claim 22, wherein the weighting factor for said each peripheral pixel is calculated in accordance with the distance on the color space.

39. The image processing method according to claim 22, wherein the noticed pixel is configured from a plurality of pixels having different colors.

40. The image processing method according to claim 22, wherein the weighting factors are calculated for the peripheral pixels for every color difference data of the peripheral pixels.

41. An image processing method, comprising:
  inputting image data representing a color image;
  calculating a distance between a noticed pixel of the inputted color image and each of peripheral pixels including the noticed pixel, as executed by a processing unit on a computer;
  calculating a weighting factor for each peripheral pixel in accordance with the calculated distance;
  calculating image data of the noticed pixel by obtaining a weighted average of image data of the peripheral pixels using the weighing factor calculated for each peripheral pixel;
  acquiring, as a noise component a difference between image data representing the color image before image processing that is inputted by the image input device and image data representing the color image after image processing that is calculated by the weighted average processing device;
  making a nonlinear conversion of the acquired noise component: and
  subtracting the noise component subjected to the nonlinear conversion from the image data representing the color image before image processing.

42. The image processing method according to claim 41, wherein the nonlinear conversion comprises eliminating only the noise component at small level from the noise component.

* * * * *